US011101748B2

(12) United States Patent
Maeda et al.

(10) Patent No.: US 11,101,748 B2
(45) Date of Patent: Aug. 24, 2021

(54) METHOD OF MANUFACTURING AN ELECTROSTATIC INDUCTION TRANSDUCER, ELECTROSTATIC INDUCTION TRANSDUCER, AND WRISTWATCH

(71) Applicant: CITIZEN WATCH CO., LTD., Tokyo (JP)

(72) Inventors: Toshinari Maeda, Tokorozawa (JP); Makoto Watanabe, Tokorozawa (JP); Yasuo Kitajima, Sayama (JP); Izumi Yamamoto, Sayama (JP)

(73) Assignee: CITIZEN WATCH CO., LTD., Tokyo (JP)

(*) Notice: Subject to any disclaimer, the term of this patent is extended or adjusted under 35 U.S.C. 154(b) by 71 days.

(21) Appl. No.: 16/667,895

(22) Filed: Oct. 29, 2019

(65) Prior Publication Data

US 2020/0144937 A1    May 7, 2020

(30) Foreign Application Priority Data

Nov. 1, 2018  (JP) .............................. JP2018-206823
Nov. 1, 2018  (JP) .............................. JP2018-206824
Nov. 12, 2018 (JP) .............................. JP2018-212493

(51) Int. Cl.
*H02N 1/08*   (2006.01)
*H02N 1/00*   (2006.01)
*G04C 10/00*  (2006.01)

(52) U.S. Cl.
CPC .............. *H02N 1/08* (2013.01); *G04C 10/00* (2013.01); *H02N 1/002* (2013.01)

(58) Field of Classification Search
CPC ........... H02N 1/08; H02N 1/002; G04C 10/00
See application file for complete search history.

(56) References Cited

U.S. PATENT DOCUMENTS

| 2010/0194236 A1* | 8/2010 | Verkoglyad | H02N 1/08 |
| | | | 310/308 |
| 2013/0076199 A1* | 3/2013 | Yamagishi | H02K 1/28 |
| | | | 310/216.121 |
| 2017/0110988 A1* | 4/2017 | Izumi | H02N 1/08 |
| 2017/0133952 A1* | 5/2017 | Matsumoto | G04C 10/00 |

FOREIGN PATENT DOCUMENTS

JP    2015-186424 A    10/2015

* cited by examiner

*Primary Examiner* — Burton S Mullins
(74) *Attorney, Agent, or Firm* — HEA Law PLLC

(57) ABSTRACT

Provided is a method of manufacturing an electrostatic induction transducer, the method including: providing a conductive substrate; providing a first electret material film on a first surface of the conductive substrate; providing a second electret material film on a second surface of the conductive substrate; forming a through hole that penetrates the conductive substrate, the first electret material film, and the second electret material film; mounting a supported member being conductive to the conductive substrate while allowing the conductive substrate to move in an in-plane direction; and applying charges to the first electret material film and the second electret material film by a charging process.

15 Claims, 25 Drawing Sheets

FIG.1
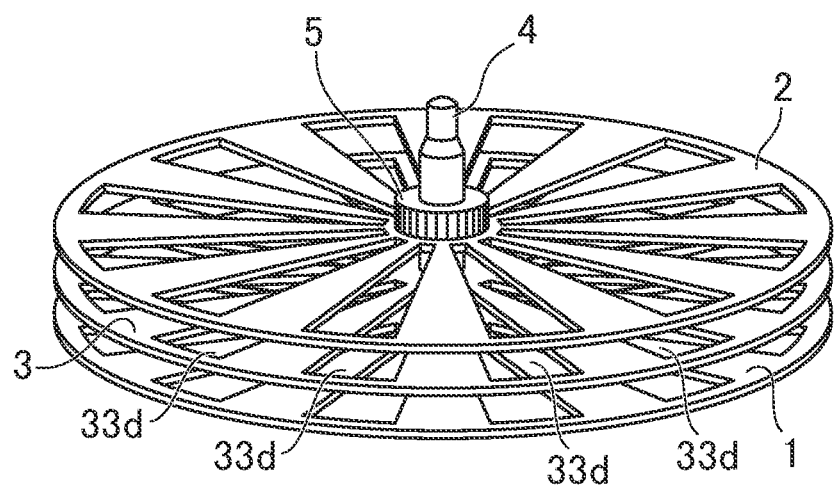
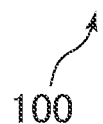

METHOD OF MANUFACTURING AN ELECTROSTATIC INDUCTION TRANSDUCER, ELECTROSTATIC INDUCTION TRANSDUCER, AND WRISTWATCH

CROSS-REFERENCE TO RELATED APPLICATION

The present application claims priority from Japanese application JP2018-206823 filed on Nov. 1, 2018, JP2018-206824 filed on Nov. 1, 2018, and JP2018-212493 filed on Nov. 12, 2018, the content of which is hereby incorporated by reference into this application.

BACKGROUND OF THE INVENTION

1. Field of the Invention

The present invention relates to a method of manufacturing an electrostatic induction transducer, an electrostatic induction transducer, and a wristwatch.

2. Description of the Related Art

In Japanese Patent Application Laid-open No. 2015-186424, there is described an electrostatic induction generator, in which a first electret film and a second electret film are respectively provided on both sides of a second substrate being rotated, and which is configured to extract a charge via a rectifier circuit in association with the rotation of the second substrate, the charge being induced in a first counter electrode arranged so as to face the first electret film and a second counter electrode arranged so as to face the second electret film. The substrate having electret films formed on both sides is provided so as to have its movement allowed in the in-plane direction and restricted in the normal direction. In order to improve the operation efficiency of an electrostatic induction transducer and to extend its service life, it is desired that the force of the substrate acting in the normal direction be small, but the force depends on the charge of the electret film formed on each surface of the substrate.

In view of the foregoing, further improvements are desired in a technology relating to the electrostatic induction transducer from the viewpoint of simplifying a manufacturing process and suppressing a decrease in energy conversion efficiency.

SUMMARY OF THE INVENTION

An object of the present invention is to simplify a manufacturing process. Another object of the present invention is to suppress a decrease in energy conversion efficiency.

The invention disclosed in this application to achieve the above-mentioned object has various aspects, and the representative aspects are outlined as follows.

(1) A method of manufacturing an electrostatic induction transducer, the method including: providing a conductive substrate; providing a first electret material film on a first surface of the conductive substrate; providing a second electret material film on a second surface of the conductive substrate; forming a through hole that penetrates the conductive substrate, the first electret material film, and the second electret material film; mounting a supported member being conductive to the conductive substrate while allowing the conductive substrate to move in an in-plane direction; and applying charges to the first electret material film and the second electret material film by a charging process.

(2) An electrostatic induction transducer, including: an electret substrate including: a conductive substrate; a first electret film, which is provided on a first surface of the conductive substrate, and is charged; and a second electret film, which is provided on a second surface of the conductive substrate, and is charged; a supported member being conductive, which is mounted to the electret substrate so as to be electrically connected to the conductive substrate, and is supported so as to allow the electret substrate to move in an in-plane direction; a first counter electrode arranged so as to face the first electret film; and a second counter electrode arranged so as to face the second electret film, wherein the conductive substrate has a burr protruding on a side of the second surface at an edge portion of the conductive substrate, and wherein the supported member is provided so as to cause a first protrusion on the side of the second surface to become larger than a second protrusion on a side of the first surface in a direction perpendicular to the conductive substrate.

(3) An electrostatic induction transducer, including: an electret substrate including: a conductive substrate; a first electret film, which is provided on a first surface of the conductive substrate, and is charged; and a second electret film, which is provided on a second surface of the conductive substrate, and is charged; a supported member being conductive, which is mounted to the electret substrate so as to be electrically connected to the conductive substrate, and is supported so as to allow the electret substrate to move in an in-plane direction; a first counter electrode arranged so as to face the first electret film; and a second counter electrode arranged so as to face the second electret film, wherein the conductive substrate has a burr protruding on a side of the first surface at an edge portion of the conductive substrate, and wherein the supported member is provided so as to cause a first protrusion on the side of the second surface to become larger than a second protrusion on a side of the first surface in a direction perpendicular to the conductive substrate.

(4) An electrostatic induction transducer, including: an electret substrate, which is supported so as to be allowed to move in an in-plane direction, and includes: a substrate being conductive; a first electret film formed on a first surface of the substrate; and a second electret film formed on a second surface of the substrate; a first counter electrode arranged so as to face the first electret film; and a second counter electrode arranged so as to face the second electret film, the electret substrate includes a plurality of edge portions, wherein the plurality of edge portions includes: a first edge portion at which a burr of the substrate protrudes in a direction toward the first surface; and a second edge portion at which a burr of the substrate protrudes in a direction toward the second surface.

BRIEF DESCRIPTION OF THE DRAWINGS

FIG. 1 is a schematic perspective view of an electrostatic induction transducer according to a first embodiment of the present invention.

DETAILED DESCRIPTION OF THE INVENTION

A description is made below in detail of each embodiment of the present invention based on the drawings. In the following description, like components are denoted by like reference symbols.

Figure 2:
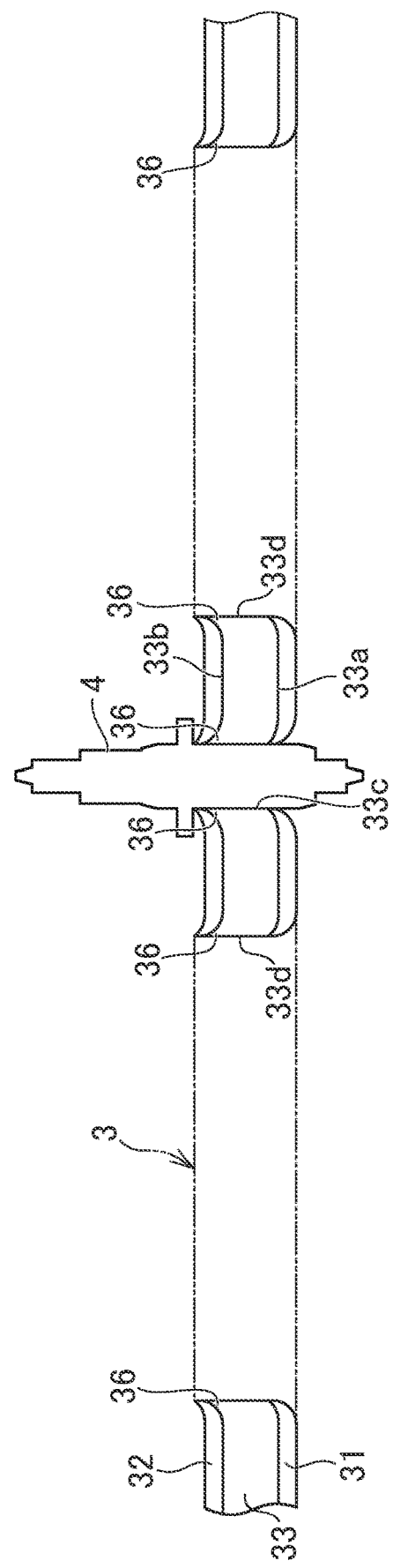
FIG. 2 is a schematic end view of an electret substrate and a rotary shaft included in the electrostatic induction transducer according to the first embodiment.

FIG. 1 is a schematic perspective view of an electrostatic induction transducer according to a first embodiment of the present invention. FIG. 2 is a schematic end view of an electret substrate and a rotary shaft included in the electrostatic induction transducer according to the first embodiment. In FIG. 2, end surfaces cut out along a plane passing through the edge portion of an electret substrate 3 are illustrated, and the contour of the electret substrate 3 is indicated by the two-dot chain line.

In this case, the electrostatic induction transducer represents a device configured to convert kinetic energy and electric energy into one another through use of electrostatic induction, and refers to a power generator or an electric motor. Although its principle is described later, when external force is caused to act on an electrostatic induction transducer 100 to supply kinetic energy, the energy can be converted into electric energy to be extracted, which means that the electrostatic induction transducer 100 serves as a power generator. Meanwhile, when electric energy is supplied to the electrostatic induction transducer 100, the energy can be extracted as kinetic energy, which means that the electrostatic induction transducer 100 serves as an electric motor.

The electrostatic induction transducer 100 illustrated in FIG. 1 is an example of an electrostatic induction transducer configured to convert mechanical rotary motion into electric energy or extract electric energy as mechanical rotary motion. The basic structure of the example electrostatic induction transducer 100 according to the first embodiment is described below.

The electrostatic induction transducer 100 includes, as its main components, a first counter electrode 1 having a disk shape, a second counter electrode 2 having a disk shape, the electret substrate 3 arranged so as to be sandwiched between the first counter electrode 1 and the second counter electrode 2 with a predetermined gap on each side, and a rotary shaft 4 serving as a supported member. In this case, the disk shape indicates that the member has a substantially flat disk shape as a whole, and it is allowable that such through holes 33d as illustrated in FIG. 1 are provided appropriately on the surface or that cutout, protrusion, or other process is performed on the outer peripheral portion.

As illustrated in FIG. 2, the electret substrate 3 includes the conductive substrate 33, a first electret film 31 provided on a first surface 33a of the conductive substrate 33, and a second electret film 32 provided on the second surface 33b of the conductive substrate 33.

In addition, the conductive substrate 33 has a plurality of through holes 33d each having a substantially fan shape as the shape in plan view, which are arranged at intervals in the circumferential direction of the conductive substrate 33. The first electret film 31 and the second electret film 32 are provided on the conductive substrate 33 in a region in which the through holes 33d are not formed. That is, the first electret film 31 is provided on the first surface 33a so as to be arranged at intervals in the circumferential direction of the conductive substrate 33, and the second electret film 32 is provided on the second surface 33b so as to be arranged at intervals in the circumferential direction of the conductive substrate 33.

The first counter electrode 1 is arranged so as to face the first electret film 31 provided on the first surface 33a of the electret substrate 3. The second counter electrode 2 is arranged so as to face the second electret film 32 provided on the second surface 33b of the electret substrate 3. It is preferred that the first counter electrode 1 and the second counter electrode 2 be fixed to an appropriate housing (not shown) or the like.

The first counter electrode 1 and the second counter electrode 2 each have a plurality of through holes each having a substantially fan shape as the shape in plan view, which are arranged at intervals in the circumferential direction of each of the first counter electrode 1 and the second counter electrode 2. That is, the first counter electrode 1 and the second counter electrode 2 are each configured such that a region provided with an electrode and a region provided with no electrode are alternately arranged in the circumferential direction of each of the first counter electrode 1 and the second counter electrode 2. However, the configurations of the first counter electrode 1 and the second counter electrode 2 are not limited thereto. For example, a plurality of first counter electrodes 1 serving as conductive films may be provided so as to be arranged on the surface of the first counter substrate having a disk shape at intervals in the circumferential direction of the first counter electrode 1, and a plurality of second counter electrodes 2 serving as conductive films may be provided so as to be arranged on the surface of the second counter substrate having a disk shape at intervals in the circumferential direction of the second counter electrode 2. Further, when such configurations are employed, transparent substrates may be used as the first counter substrate and the second counter substrate, and transparent conductive films being the first counter electrode 1 and the second counter electrode 2 may be formed on the surfaces of the transparent substrates. With this configuration, when, for example, the electrostatic induction transducer 100 is configured to be visually recognizable from the outside by forming a viewing region containing a transparent region and a through hole in a housing or the like that accommodates the electrostatic induction transducer 100, a user is allowed to visually recognize the electret substrate 3 through the transparent substrate and the transparent conductive film. For example, when the electrostatic induction transducer 100 is incorporated into, for example, a wristwatch, the user can enjoy the design by visually recognizing the shape and rotary operation of the electret substrate 3.

The rotary shaft 4 is inserted through a shaft hole 33c of the conductive substrate 33 to be mounted to the conductive substrate 33 so as to be electrically connected to the conductive substrate 33. Further, the rotary shaft 4 is supported, at its both ends, by a support portion formed in an appropriate housing (not shown) or the like so as to allow the rotary movement of the electret substrate 3. The rotary shaft 4 is supported by and fixed to the electret substrate 3 so as to rotate the electret substrate 3 with the rotation of the rotary shaft 4. The electret substrate 3 has its movement restricted in the extending direction of the rotary shaft 4. That is, a distance between the electret substrate 3 and the first counter electrode 1 and a distance between the electret substrate 3 and the second counter electrode 2 are kept constant in the extending direction of the rotary shaft 4.

As illustrated in FIG. 1, a pinion 5 is mounted to the rotary shaft 4, which enables kinetic energy to be supplied to the electrostatic induction transducer 100 or extracted from the electrostatic induction transducer 100 through a driving mechanism including a gear (not shown) configured to mesh with the pinion 5. In the first embodiment, the electrostatic induction transducer 100 is a power generator, and the rotation of a suspended weight provided through the gear meshing with the pinion 5 is input to the rotary shaft 4.

The electrostatic induction transducer 100 according to the first embodiment can be used as, for example, a small and lightweight power generator incorporated into a wristwatch. The electrostatic induction transducer 100 may also be used as a power generator for an outdoor sensor or a small light fixture, which is configured to generate power by vibrations or other external motion and supply the power, or may be used for another purpose.

Figure 3:
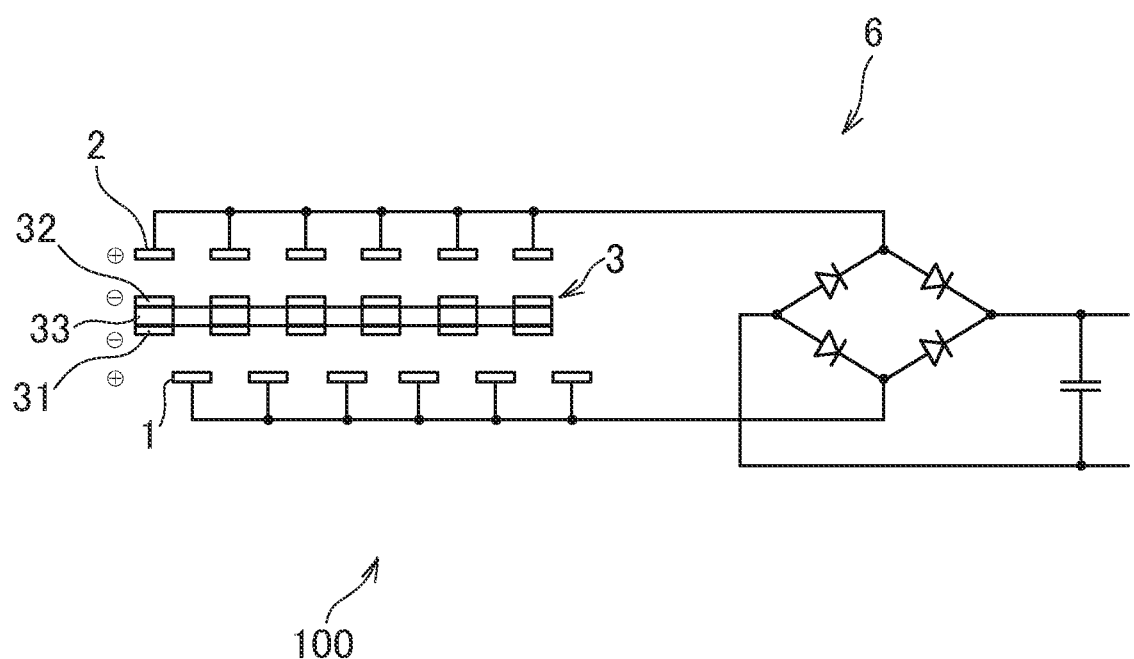
FIG. 3 is a schematic circuit diagram for illustrating an operating principle observed when the electrostatic induction transducer is used as a power generator.

FIG. 3 is a schematic circuit diagram for illustrating an operating principle observed when the electrostatic induction transducer is used as a power generator. As illustrated in FIG. 3, the electret substrate 3 and each of the first counter electrode 1 and the second counter electrode 2 are arranged so as to face each other with a predetermined slight gap in parallel.

As described above, the first counter electrode 1 and the second counter electrode 2 are each configured such that a region provided with an electrode and a region provided with no electrode are alternately arranged in the circumferential direction of each of the first counter electrode 1 and the second counter electrode 2, and the electret substrate 3 is configured such that a region provided with an electret film and a region provided with no electret film are alternately arranged in the circumferential direction of the electret substrate 3. In addition, the electret substrate 3 is provided so as to be rotatable about the rotary shaft 4. Therefore, a state in which the first electret film 31 and the second electret film 32 are directly opposed to the first counter electrode 1 and the second counter electrode 2, respectively, and a state in which the first electret film 31 and the second electret film 32 are not directly opposed to the first counter electrode 1 and the second counter electrode 2, respectively, are changed over with the rotation of the electret substrate 3.

The first electret film 31 and the second electret film 32 are formed so as to be brought into a predetermined charged state. In the first embodiment, the first electret film 31 and the second electret film 32 are both charged to have negative charges.

While the first counter electrode 1 and the second counter electrode 2 are directly opposed to the first electret film 31 and the second electret film 32, charges of an opposite polarity are accumulated in the first counter electrode 1 and the second counter electrode 2 induced by the surface charges of the first electret film 31 and the second electret film 32, respectively (in the first embodiment, positive charges are accumulated in the first counter electrode 1 and the second counter electrode 2). After that, when the electret substrate 3 is caused to move to be brought into a state in which the first electret film 31 and the second electret film 32 are not directly opposed to the first counter electrode 1 and the second counter electrode 2, respectively, the charges induced and accumulated in the first counter electrode 1 and the second counter electrode 2 are swept out and rectified by a rectifier circuit 6 and extracted as electric energy.

In FIG. 3, illustration is given of an example in which the first counter electrode 1 and the second counter electrode 2 are fixedly arranged so as to have different phases with respect to the movement direction of the electret substrate 3. However, the present invention is not limited thereto, and as illustrated in FIG. 1, the first counter electrode 1 and the second counter electrode 2 may be fixedly arranged so as to have the same phase with respect to the movement direction of the electret substrate 3.

Figure 4:
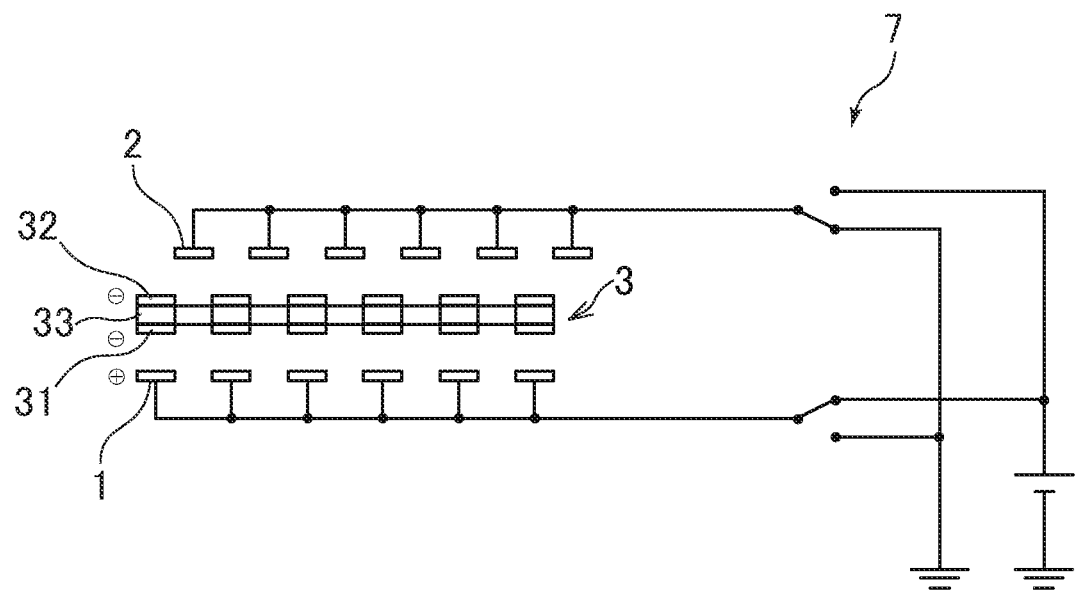
FIG. 4 is a schematic circuit diagram for illustrating an operating principle observed when the electrostatic induction transducer is used as an electric motor.

FIG. 4 is a schematic circuit diagram for illustrating an operating principle observed when the electrostatic induction transducer is used as an electric motor. Even in this case, the electret substrate 3 and each of the first counter electrode 1 and the second counter electrode 2 are arranged so as to face each other with a predetermined slight gap in parallel. The state in which the first electret film 31 and the second electret film 32 are directly opposed to the first counter electrode 1 and the second counter electrode 2, respectively, and the state in which the first electret film 31 and the second electret film 32 are not directly opposed to the first counter electrode 1 and the second counter electrode 2, respectively, are changed over with the rotation of the electret substrate 3. In FIG. 4, illustration is given of an example in which the first counter electrode 1 and the second counter electrode 2 fixedly arranged so as to have different phases with respect to the movement direction of the electret substrate 3. However, as illustrated in FIG. 1, the first counter electrode 1 and the second counter electrode 2 may be fixedly arranged so as to have the same phase with respect to the movement direction of the electret substrate 3.

The first electret film 31 and the second electret film 32 are formed so as to be brought into a predetermined charged state. In the first embodiment, the first electret film 31 and the second electret film 32 are both charged to have negative charges.

The first counter electrode 1 and the second counter electrode 2 are arranged so as to have different phases with respect to the movement direction of the electret substrate 3, and the switch circuit 7 is configured to be able to apply charges reverse to the charges of the first electret film 31 and the second electret film 32 given in the charged states to the first counter electrode land the second counter electrode 2, respectively, at predetermined timings.

At this time, when a charge reverse to the charges of the first electret film 31 and the second electret film 32 given in the charged states is applied to any one of the first counter electrode 1 and the second counter electrode 2, the electret substrate 3 is caused to move so that the first electret film 31 or the second electret film 32 is directly opposed to a counter electrode to which the reverse charge is applied. When the switch circuit 7 is switched as appropriate to switch whether or not to apply the charge reverse to the charges of the first counter electrode 1 and the second counter electrode 2 at satisfactory timings, continuous motion can be applied to the electret substrate 3, and linear motion, rotary motion, vibration motion, and other such motion are extracted.

In this case, a material that is easily charged is used as a material of the electret film. Examples of a material that is charged to have a negative charge include silicon oxide and fluorine resin. As a specific example of such a material, there is a fluorine resin called CYTOP (trademark) manufactured by AGC Inc. As the material of the electret film, it is also possible to use polymer materials including polypropylene, polyethylene terephthalate, polyvinyl chloride, polystyrene, polytetrafluoroethylene, polyvinylidene difluoride, and polyvinyl fluoride and inorganic materials including silicon oxide described above, silicon nitride, and silicon oxynitride.

As a matter of course, the above-mentioned circuit configuration for using the electrostatic induction transducer 100 as a power generator or an electric motor is merely an example, and it is possible to employ other arrangement of various members and other configurations.

As described above, the electret substrate 3 is provided so as to have its rotation allowed but have its movement restricted in the normal direction (direction perpendicular to the surface of the electret substrate 3). Meanwhile, electrostatic forces acting on the electret substrate 3 are attraction (or repulsion) acting between the first electret film 31 and the first counter electrode 1 and between the second electret film 32 and the second counter electrode 2. Therefore, force acts on the electret substrate 3 in the normal direction.

In regard to this force, the first electret film 31 and the second electret film 32 are formed on both sides of the electret substrate 3, and the electrostatic forces acting on those electret films have opposite directions with respect to the normal direction of the electret substrate 3. Therefore, when the respective forces acting on the first electret film 31 and the second electret film 32 are balanced, the forces in the normal direction cancel out each other. When the forces are not balanced, the force in the normal direction remains.

The force in the normal direction that has been generated and remains in the electret substrate 3 is the force acting in a direction in which the rotary shaft 4 extends. Therefore, as the remaining force in the normal direction becomes larger, the rotation resistance of the electret substrate 3 becomes larger, and a loss of energy may be caused to lower the conversion efficiency of the electrostatic induction transducer 100. The remaining force in the normal direction may also cause wear of the rotary shaft 4 or other such component to cause a decrease in service life of the electrostatic induction transducer 100. Therefore, the respective electrostatic forces acting on the first electret film 31 and the second electret film 32 are desired to be balanced.

In order to balance the electrostatic forces acting on the first electret film 31 and the second electret film 32, it is only required to balance the amount of charge held by the respective electret films. However, it cannot easily be achieved.

Figure 5A:
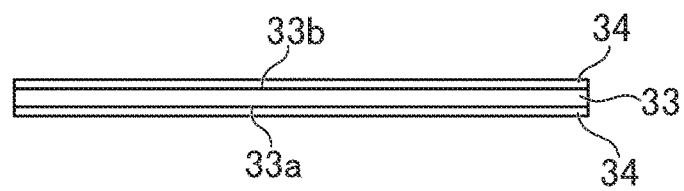
FIG. 5A is a view for illustrating a manufacturing process for the electret substrate.

The reason is described with reference to FIG. 5A to FIG. 7. FIG. 5A to FIG. 5E are views for illustrating manufacturing processes for the electret substrate. First, the conductive substrate 33 is provided, and electretmaterial films 34 are provided on both sides thereof (FIG. 5A). No particular limitations are imposed on the material of the conductive substrate 33 as long as the material is conductive and has sufficient rigidity against the electrostatic force that has been generated. In the first embodiment, the conductive substrate 33 is made of metal, and in particular, aluminum is used as its material. The conductive substrate 33 is required to be conductive in order to be grounded in a charging step for the electret material films 34, which is described later. The conductive substrate 33 may be configured to be grounded when being incorporated into the electrostatic induction transducer 100, or may be configured to be connected to a rectifier circuit.

A method of forming the electret material films 34 may be selected depending on a material thereof, and is not particularly limited. However, the method of forming films on the entire surfaces on both sides of the conductive substrate 33 is simple and is therefore suitably employed. Examples of such a method include, as long as a so-called wet process can be used with a liquid electret material, dip coating, spin coating, curtain flow coating, spray coating, gravure coating, and other such appropriate coating method. As other methods, vapor deposition, such as PVD including sputtering or ion plating or CVD, a method of attaching a film made of an electret material to the conductive substrate 33, or other such method may be employed.

Figure 5B:
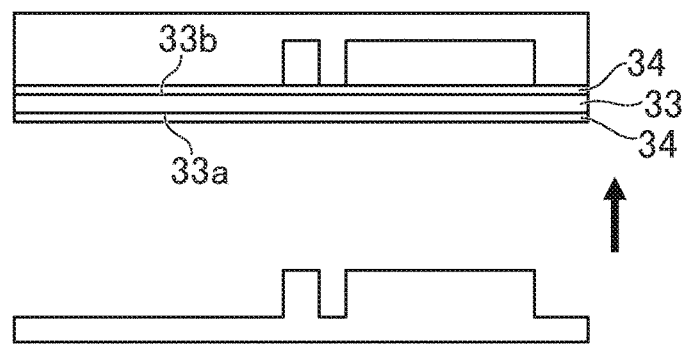
FIG. 5B is a view for illustrating a manufacturing process for the electret substrate.
Figure 5C:
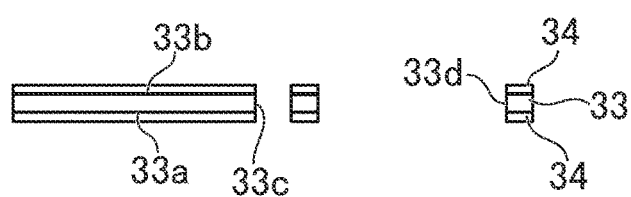
FIG. 5C is a view for illustrating a manufacturing process for the electret substrate.

After that, the conductive substrate 33 is processed into a desired shape by a punching process using a press (FIG. 5B and FIG. 5C). At this time, the shaft hole 33c through which the rotary shaft 4 is inserted and the plurality of through holes 33d each having a substantially fan shape may be simultaneously formed on the conductive substrate 33. However, the present invention is not limited thereto, and the plurality of through holes 33d and the shaft hole 33c may be sequentially formed by the punching process.

Figure 5D:
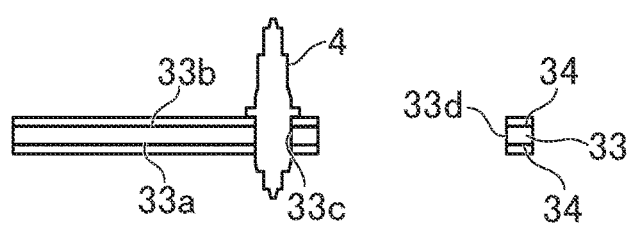
FIG. 5D is a view for illustrating a manufacturing process for the electret substrate.

Then, the rotary shaft 4 is mounted to the conductive substrate 33 so as to be electrically connected to the conductive substrate 33 (FIG. 5D).

Figure 5E:
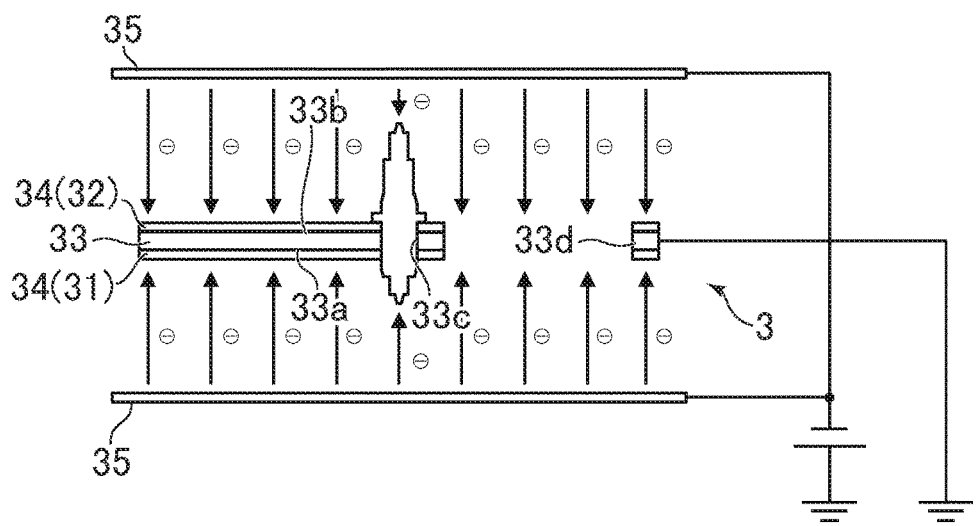
FIG. 5E is a view for illustrating a manufacturing process for the electret substrate.

Finally, the conductive substrate 33 is grounded, and the electret material films 34 on both sides are subjected to a charging process to charge the electret material film 34. There are also no particular limitations on this charging process, but a corona discharge process is used in this case. With this charging process, the electret material film 34 on the first surface 33a and the electretmaterial film 34 on the second surface 33b of the conductive substrate 33 are charged to the same potential to become the first electret film 31 and the second electret film 32, respectively, and the electret substrate 3 is thus manufactured (FIG. 5E). In FIG. 5E, corona discharge electrodes 35 and how the charge is applied by corona discharge are schematically illustrated.

The electret substrate 3 having been manufactured is further assembled so as to have the movement allowed in the in-plane direction in such a manner that the first electret film 31 faces the first counter electrode 1 fixedly provided in the appropriate housing and the second electret film 32 faces the second counter electrode 2 fixedly provided in the appropriate housing. In addition, through steps of, for example, wiring and connecting appropriate circuits or other such component, the electrostatic induction transducer 100 is produced.

Through the above-mentioned steps, the electret substrate 3 and the electrostatic induction transducer 100 into which the electret substrate 3 is incorporated are produced. At this time, the charge amounts of the first electret film 31 and the second electret film 32 are not always equal to each other, and may result in an imbalance. The reason is described with reference to FIG. 6.

Figure 6:
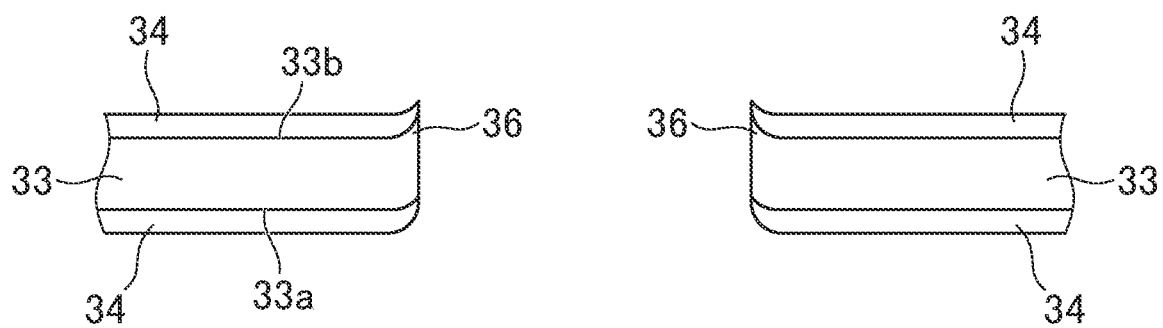
FIG. 6 is a partially enlarged view for schematically illustrating how cut end surfaces appear immediately after a punching process illustrated in FIG. 5B is performed on a conductive substrate provided with electret material films on both sides.

FIG. 6 is a partially enlarged view for schematically illustrating how cut end surfaces appear immediately after the punching process illustrated in FIG. 5B is performed on the conductive substrate provided with electret material films on both sides. In FIG. 6, the shapes of the end surfaces given when the conductive substrate 33 is punched out in a direction from the first surface 33a side to the second surface 33b side by the blade of a punching die are illustrated. As illustrated in FIG. 6, burrs 36 protruding in the punching direction are caused at the edge portions of the conductive substrate 33 by the punching process.

Figure 7:
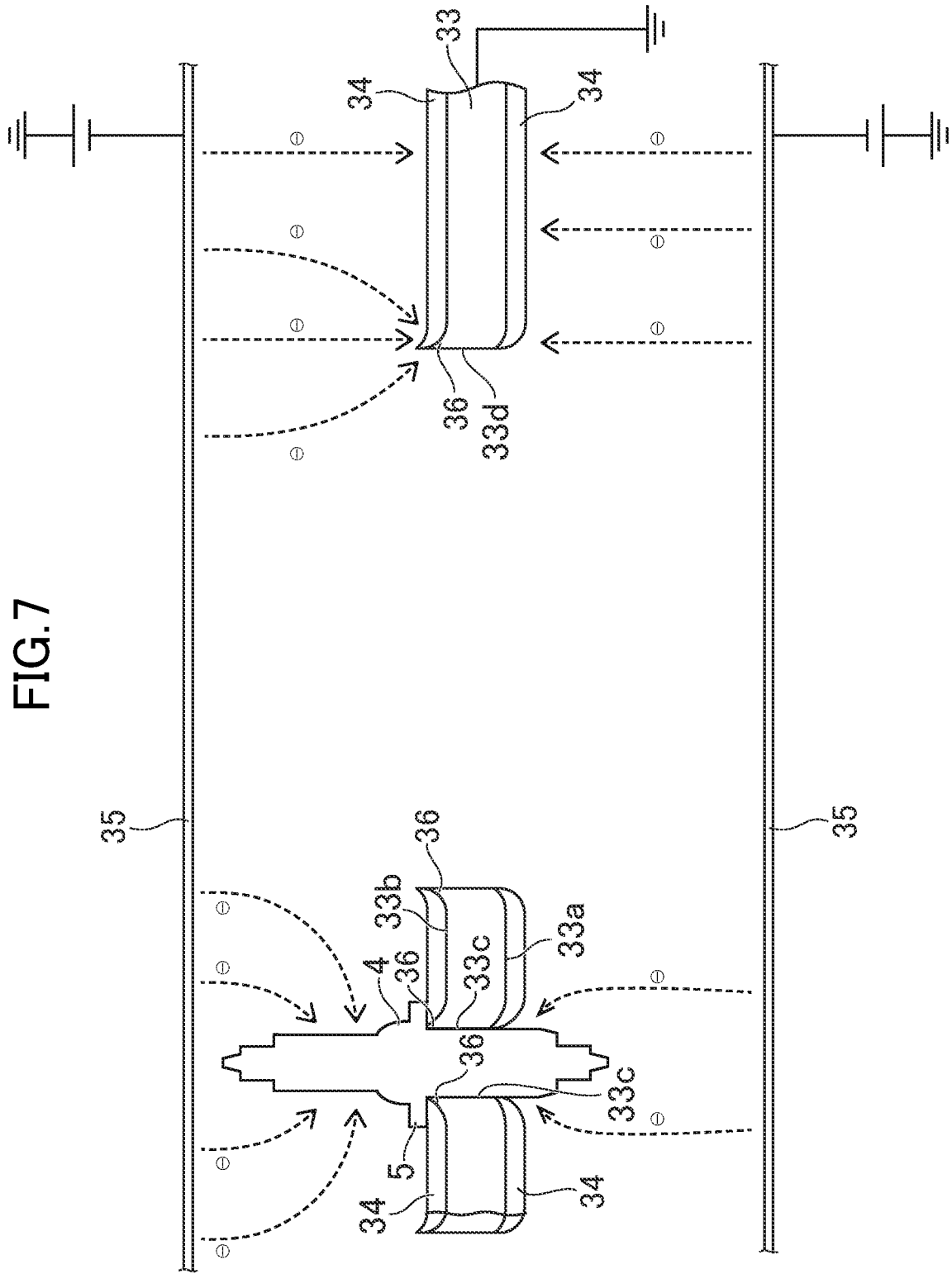
FIG. 7 is a view for illustrating an influence of burrs and the rotary shaft to be exerted on a charging process.

FIG. 7 is a view for illustrating an influence of burrs and the rotary shaft to be exerted on the charging process.

When the conductive substrate 33 having the burrs 36 is grounded and subjected to the charging process, which is the corona discharge process in the first embodiment, lines of electric force concentrate at the burrs 36 on a surface from which the burrs 36 protrude as illustrated in FIG. 7, and the discharged charges are caused to flow to the conductive substrate 33, to thereby cause a decrease in amount of charge applied to the electret material film 34 in the vicinity of the burrs 36. In FIG. 7, the broken line arrows indicate the lines of electric force and the movement of charges released along the lines of electric force.

This phenomenon occurs on the surface from which the burrs 36 protrude (second surface 33b illustrated in FIG. 7), and does not occur on the opposite surface (first surface 33a illustrated in FIG. 7). Therefore, even when an attempt is made to charge the electret material film 34 by applying the same voltage on each of the first surface 33a side and the second surface 33b side, an imbalance in charge amount of the electret material film 34 occurs between above and below the surfaces of the conductive substrate 33. In the example illustrated in FIG. 7, the electret material film 34 provided on the first surface 33a has a charge amount larger than a charge amount of the electret material film 34 provided on the second surface 33b.

In order to equalize the charge amounts of the electret material films 34 provided on both sides of the conductive substrate 33, it is conceivable to cause, in the charging process, an applied voltage with respect to the electret material film 34 provided on the first surface 33a of the conductive substrate 33 and an applied voltage with respect to the electret material film 34 provided on the second surface 33b of the conductive substrate 33 to become different from each other. For example, it is conceivable to set the applied voltage with respect to the electret material film 34 provided on the second surface 33b of the conductive substrate 33 higher than the applied voltage with respect to the electret material film 34 provided on the first surface 33a of the conductive substrate 33. However, during the processes of manufacturing the individual electrostatic induction transducers 100, manufacturing variations may occur in protrusion amount of the burr 36, which makes it difficult to control how much the applied voltages are caused to become different from each other.

In this case, the burr 36 is not the only factor that exerts an influence on the charge amount in the charging process. The rotary shaft 4 protrudes from the conductive substrate 33 in its normal direction, and is a conductive member electrically connected to the conductive substrate 33 which is grounded. Therefore, the lines of electric force concentrate on the rotary shaft 4 as well during the charging process, to thereby inhibit the charging of the electret material film 34 in its vicinity. In addition, the protrusion amount of the rotary shaft 4 is larger than the protrusion amount of the burr 36, and hence a larger influence is exerted on the charge amount in the charging process by the rotary shaft 4 than by the burr 36. Then, the influence becomes more conspicuous as a length by which the rotary shaft 4 protrudes in the normal direction becomes longer, that is, as the rotary shaft 4 becomes closer to the discharge electrode.

When the length by which the rotary shaft 4 protrudes in a direction toward the first surface 33a of the conductive substrate 33 and the length by which the rotary shaft 4 protrudes in a direction toward the second surface 33b of the conductive substrate 33 are equal to each other, the influences of the charging on the electret material films 34 are substantially the same on both sides of the substrate 3, which avoids causing an imbalance between the charge amounts of the first electret film 31 and the second electret film 32. However, the rotary shaft 4 is assembled together with the pinion 5 and provided with the driving mechanism including the gear (not shown) configured to mesh with the pinion 5, which correspondingly causes the rotary shaft 4 to significantly protrude on one side.

In view of the foregoing, in the first embodiment, the burrs 36 are set to be formed on a side with a larger protrusion amount of the rotary shaft 4. That is, the rotary shaft 4 is provided such that the protrusion amount on the second surface 33b side is larger than the protrusion amount on the first surface 33a side in the direction perpendicular to the conductive substrate 33, to thereby reduce the influence of manufacturing variations in protrusion amount of the burr 36. This is because even when manufacturing variations occur in protrusion amount of the burr 36, the influence on the charge amount exerted by the burrs 36 is relatively small due to the dominant influence on the charge amount exerted by the rotary shaft 4. In other words, the adjustment amount of a voltage to be applied can be determined only in consideration of the influence on the charge amount due to the protrusion amount of the rotary shaft 4, and hence, irrespective of the manufacturing variations in protrusion amount of the burr 36, it is possible to easily adjust a voltage value to be set for each of the applied voltage with respect to the first electret film 31 and the applied voltage with respect to the second electret film 32. Then, it is possible to balance the charge amounts on both sides of the conductive substrate 33. In short, this reduces the rotation resistance of the electret substrate 3, and a loss of energy is less liable to occur. That is, it is possible to suppress a decrease in energy conversion efficiency. In addition, the reduction in rotation resistance suppresses wear of the rotary shaft 4 or other such component, and also suppresses a decrease in service life of the electrostatic induction transducer 100.

Figure 8:
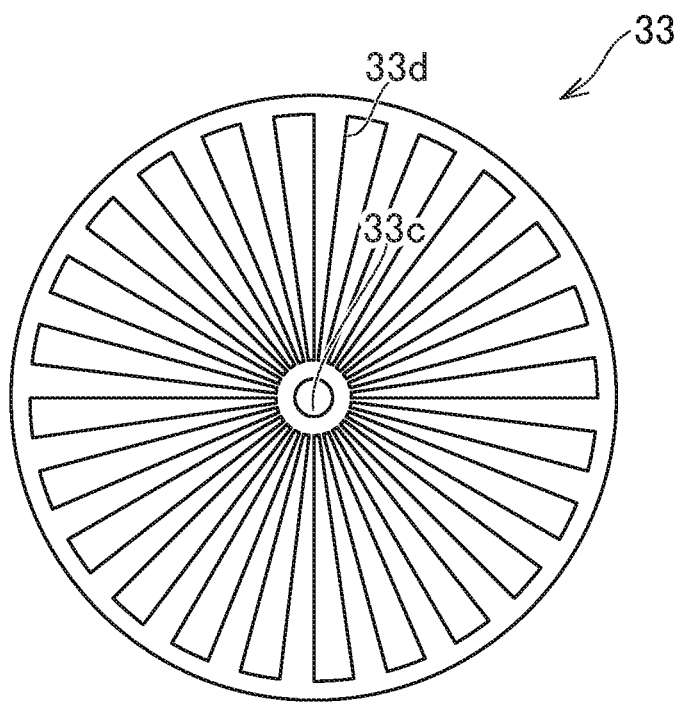
FIG. 8 is a plan view of the conductive substrate in the first embodiment.

Next, patterns of the configuration of the conductive substrate included in the electret substrate are described with reference to FIG. 8 to FIG. 10. FIG. 8 is a plan view of the conductive substrate of the first embodiment. The conductive substrate 33 has a disk shape as a whole, and in this case, has a wheel shape, that is, a shape in which a portion extending in the circumferential direction in the vicinity of the center and an outer peripheral portion extending in the circumferential direction are connected to each other by a large number of spokes. In addition, the shaft hole 33c for mounting the rotary shaft 4 is provided at the center of the conductive substrate 33.

Figure 9:
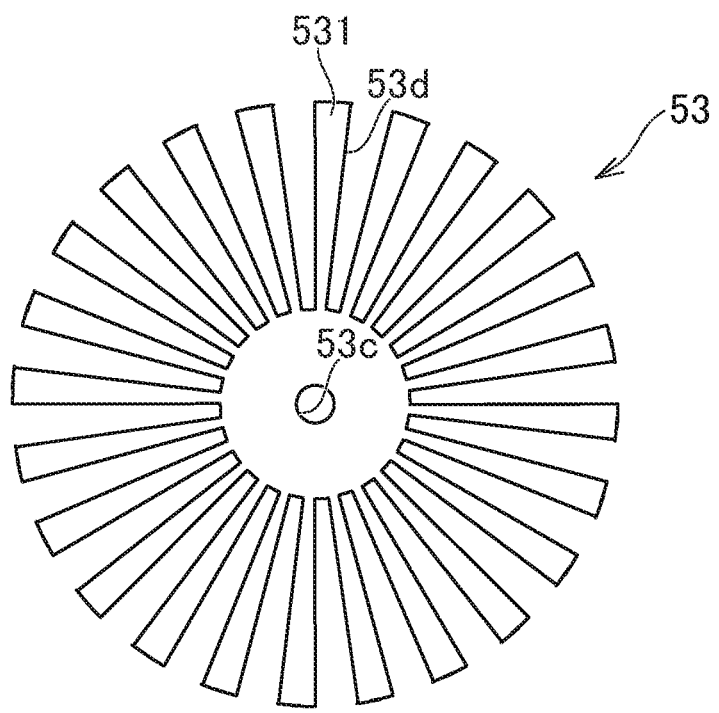
FIG. 9 is a plan view of a conductive substrate in a first modification example of the first embodiment.

FIG. 9 is a plan view of a conductive substrate in a first modification example of the first embodiment. A conductive substrate 53 in the first modification example has a shape having a plurality of tongue portions 531 extending radially from the central part while maintaining a disk shape as a whole.

In the conductive substrate 53, burrs are formed at an edge portion 53d of the tongue portions 531 and an edge portion of a shaft hole 53c. Therefore, when the conductive substrate 53 is used, the rotary shaft 4 is desired to be provided such that the protrusion amount is larger on the side of a surface from which the burrs protrude at the edge portion 53d of the tongue portions 531 and the edge portion of the shaft hole 53c.

Figure 10:
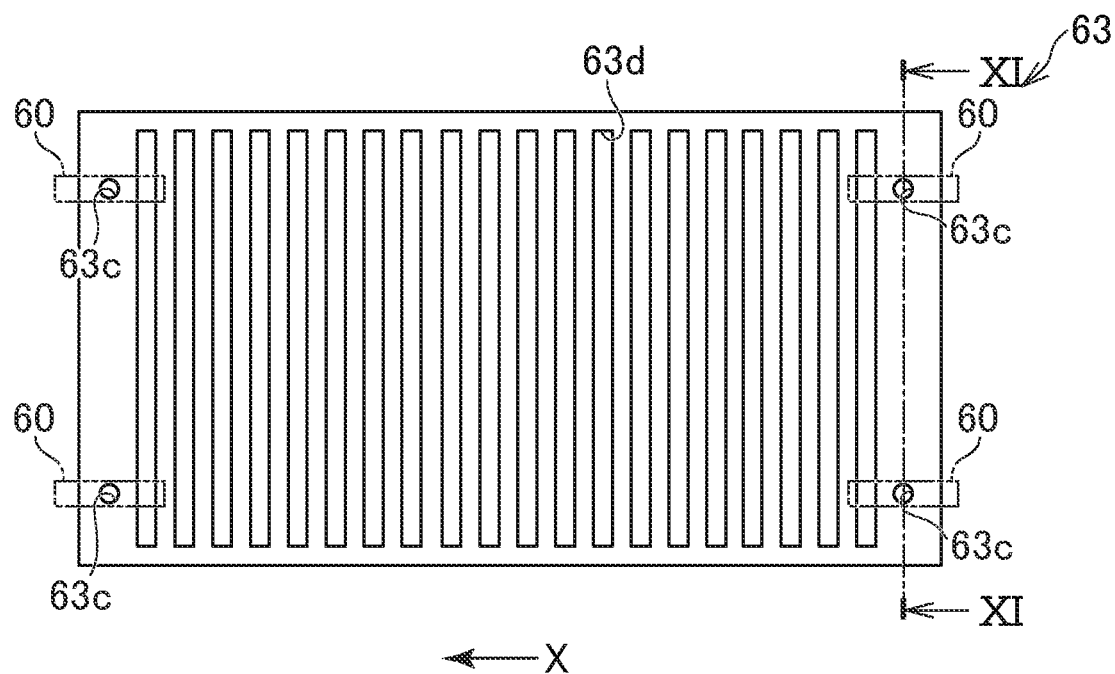
FIG. 10 is a plan view of a conductive substrate in a second modification example of the first embodiment.
Figure 11:
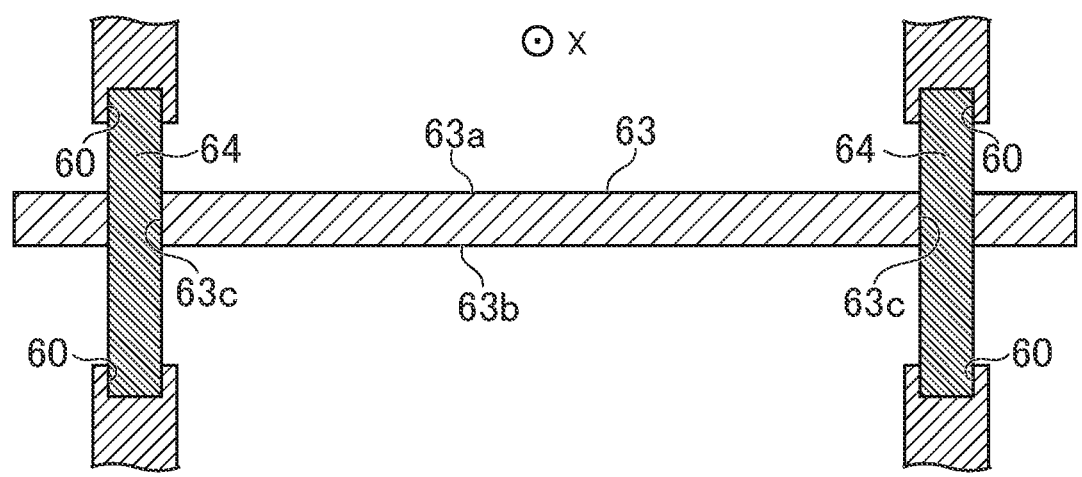
FIG. 11 is a sectional view taken along the cutting line XI-XI in FIG. 10.

FIG. 10 is a plan view of a conductive substrate in a second modification example of the first embodiment. FIG. 11 is a sectional view taken along the cutting line XI-XI in FIG. 10. In FIG. 10, the two-dot chain line represents an imaginary line indicating a groove 60 formed in a housing or the like. In FIG. 11, an electret film, the burrs of a conductive substrate 63 and a counter electrode are omitted from the illustration.

The movement of the electret substrate is not limited to the rotary motion that has been described above, and may be reciprocating motion or translational motion. In such a case, the conductive substrate 63 having such a rectangular shape as illustrated in FIG. 10 may be used.

The conductive substrate 63 has a rectangular shape in which a plurality of slits 63d are formed, and is provided so as to be allowed to move in a direction in which the plurality of slits 63d are arranged (direction X and its opposite direction in FIG. 10). Specifically, the conductive substrate 63 has a hole 63c, and a shaft 64 serving as a supported member is inserted through the hole 63c. Further, the shaft 64 is supported by and fixed to the conductive substrate 63 so as to cause the conductive substrate 63 to move with the movement of the shaft 64. The shaft 64 may be provided so as to be slidable in the direction X and its opposite direction in FIG. 10 by having both ends fitted into the grooves 60, which are formed in the appropriate housing or the like so as to extend in the direction X. Then, the shaft 64 may be provided such that the protrusion amount is larger on the side of the surface 63b from which the burrs protrude (second surface) at the edge portions of the slits 63d and the edge portions of the holes 63c.

The conductive substrate 63 having such a shape is suitable when, for example, the electrostatic induction transducer 100 using the conductive substrate 63 is a so-called vibration power generator configured to pick up vibrations in a specific direction to convert the vibrations into electric power. As a matter of course, the conductive substrate 63 may be used for other purposes.

In the first embodiment and its modification examples, the conductive shaft is illustrated as the supported member, but the present invention is not limited thereto, and any shaft may be employed as long as the shaft is electrically connected to the conductive substrate and protrudes in a direction perpendicular to the conductive substrate. In addition, the supported member may be provided so as to have a larger protrusion amount on any one of the upper side and the lower side in the housing. Any supported member may be provided as long as the protrusion amount is larger at least on the side on which the burrs 36 protrude.

Figure 12:
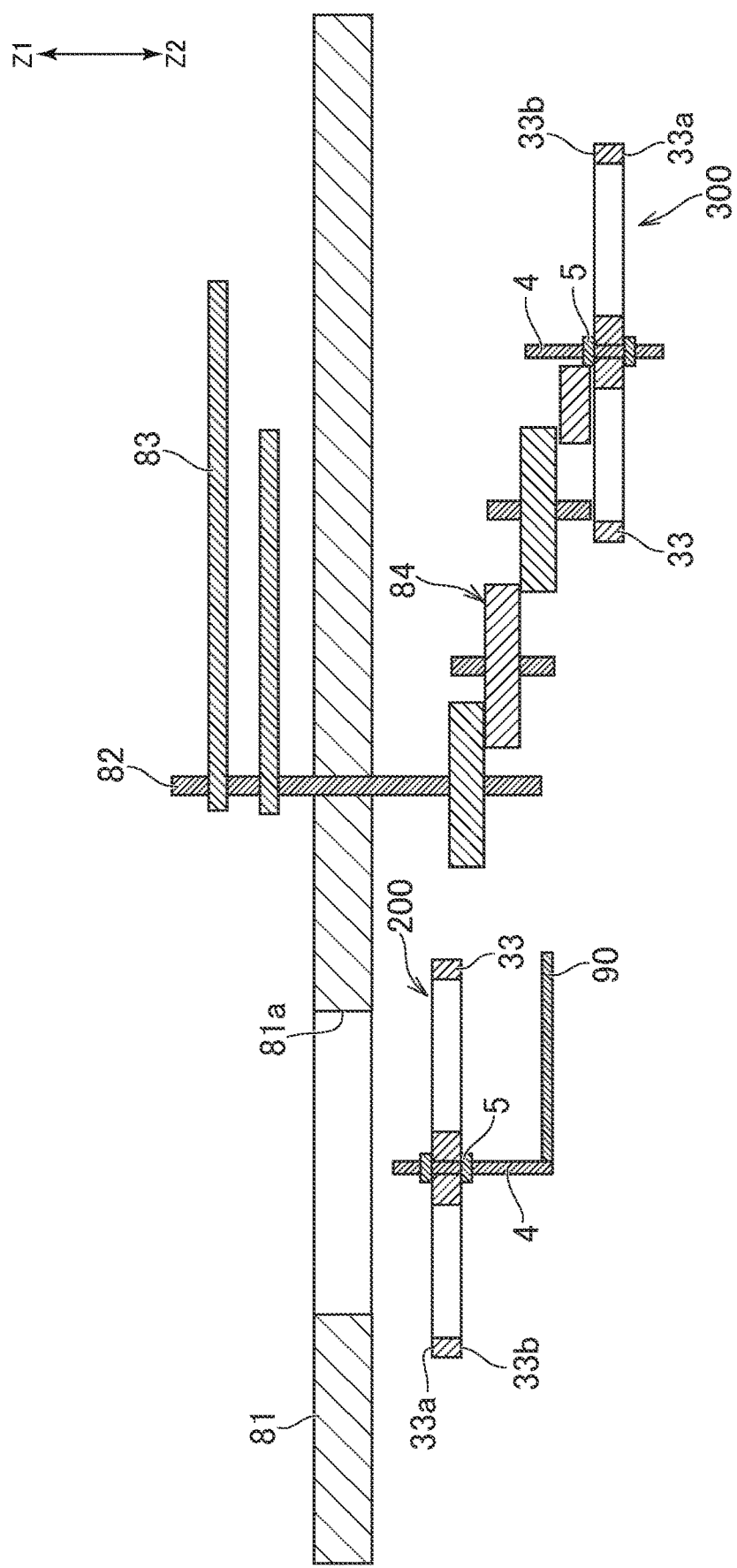
FIG. 12 is a view for illustrating an example in which the electrostatic induction transducers according to the first embodiment are incorporated into a wristwatch.

FIG. 12 is a view for illustrating an example in which the electrostatic induction transducers according to the first embodiment are incorporated into a wristwatch. In the example illustrated in FIG. 12, two electrostatic induction generators having different functions are built into the wristwatch. Specifically, an electrostatic induction transducer 200 serving as a power generator and an electrostatic induction transducer 300 serving as an electric motor are illustrated, and have the same configurations as that of the electrostatic induction transducer 100 described above. However, in FIG. 12, a counter electrode and an electret film are omitted from the illustration. In FIG. 12, a direction indicated by the arrow Z1 is corresponds to an upward direction, and a direction indicated by the arrow Z2 is corresponds to a downward direction.

The wristwatch includes a dial 81, a hand shaft 82, hands 83 mounted to the hand shaft 82, and a wheel train 84 configured to drive the hand shaft 82 to rotate.

In the wristwatch illustrated in FIG. 12, a viewing region 81a is formed in the dial 81. The viewing region 81a may be formed of a through hole or a transparent member to allow the user to visually recognize the inside of the wristwatch. In the example illustrated in FIG. 12, the electrostatic induction transducer 200 is arranged below the dial 81 so as to overlap with the viewing region 81a in plan view. As described above, the conductive substrate has a shape excellent in design, for example, a wheel shape, and the user can enjoy the design of the wristwatch by visually recognizing the conductive substrate being driven to rotate.

When the configuration that allows the user to visually recognize the electrostatic induction transducer 200 is employed in such a manner, the counter electrode on the viewing region 81a side is desired to be a transparent electrode. In another case, it is desired to arrange a transparent substrate on the viewing region 81a side, and to form a transparent conductive film serving as the counter electrode on the transparent substrate.

In the example illustrated in FIG. 12, the surface of the conductive substrate 33 included in the electrostatic induction transducer 200 on which burrs are formed (second surface 33b) is arranged so as to face downward. That is, the electrostatic induction transducer 200 is arranged such that the surface on which burrs are not formed (first surface 33a) faces the dial 81. With this arrangement, a user may visually recognize, through the viewing region 81a, the surface on which burrs are not formed (first surface 33a), which has a more satisfactory appearance than that of the surface on which burrs are formed (second surface 33b).

In FIG. 12, illustration is given of an example in which the rotary shaft 4 is rotated with the rotation of the suspended weight 90 mounted to the rotary shaft 4 on the side on which the protrusion amount is large, that is, the side on which burrs are formed. Through employment of such a configuration, it is possible to allow the user to visually recognize the planar shape of the electret substrate without the intermediation of the suspended weight 90 or other such driving mechanism configured to drive the rotary shaft 4.

In the example illustrated in FIG. 12, the pinion 5 of the electrostatic induction transducer 300 serving as an electric motor meshes with a gear included in the wheel train 84 configured to drive the hand shaft 82 to rotate. Therefore, the hands 83 are rotated with the rotation of the rotary shaft 4 included in the electrostatic induction transducer 300.

The electrostatic induction transducer 200 and the electrostatic induction transducer 300 illustrated in FIG. 12 have the same configuration, and hence each may be used as a power generator or an electric motor, or both may be used as a power generator or an electric motor.

Figure 13:
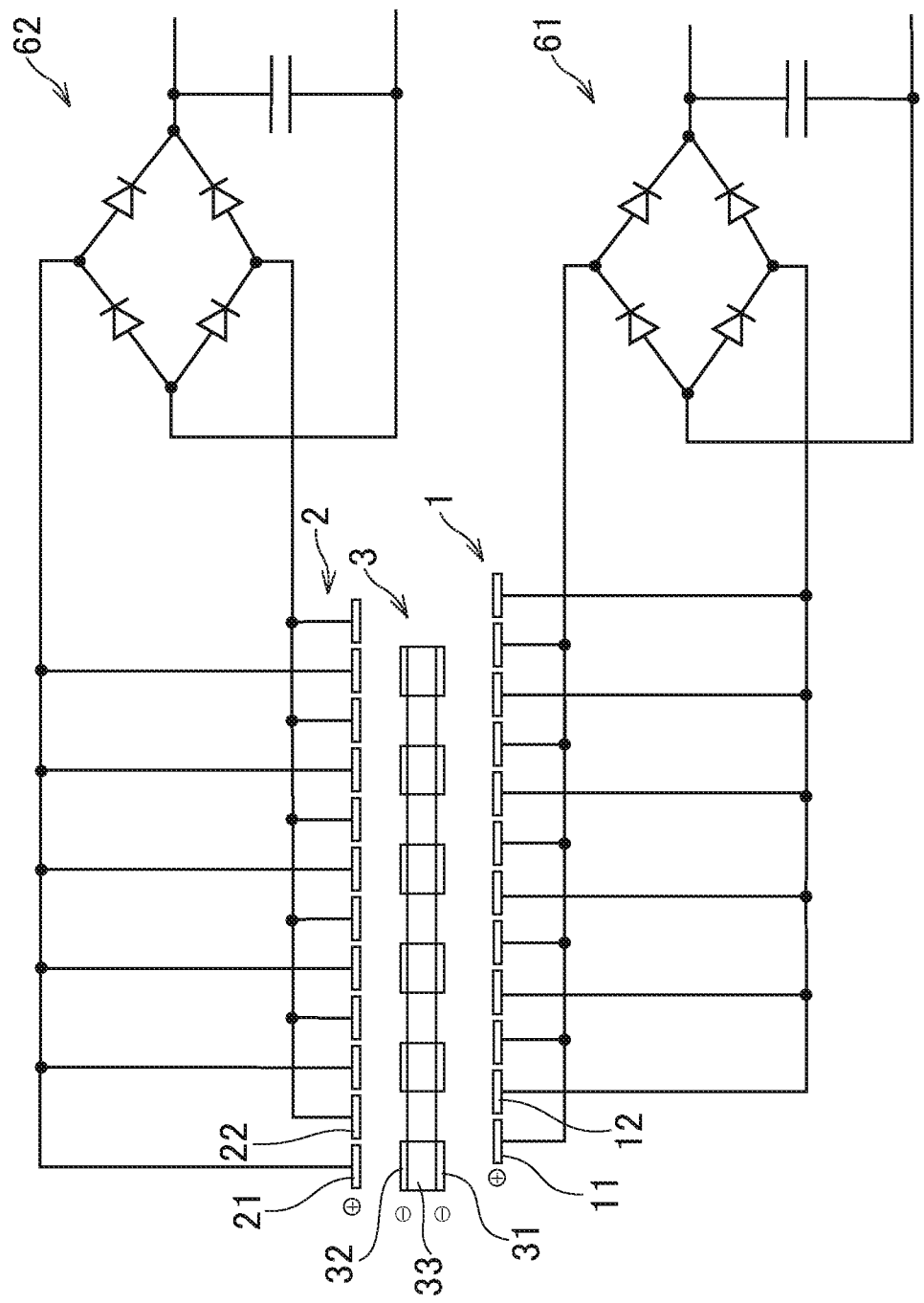
FIG. 13 is a schematic circuit diagram for illustrating an operating principle observed when an electrostatic induction transducer according to a third modification example of the first embodiment is used as a power generator.

FIG. 13 is a schematic circuit diagram for illustrating an operating principle observed when an electrostatic induction transducer according to a third modification example of the first embodiment is used as a power generator. The circuit configuration employed when the electrostatic induction transducer is used as a power generator is not limited to the circuit configuration illustrated in FIG. 3. In the third modification example, as illustrated in FIG. 13, a plurality of first counter electrodes 11 among the first counter electrodes 1 are provided so as to be arranged at intervals in the circumferential direction, and a plurality of first counter electrodes 12 are arranged therebetween. The first counter electrodes 11 and the first counter electrodes 12 are also connected to a rectifier circuit 61 to allow electric energy to be taken out from the respective electrodes.

Meanwhile, a plurality of second counter electrodes 21 among the second counter electrodes 2 are provided so as to be arranged at intervals in the circumferential direction while having the phases different from those of the first counter electrodes 1. The second counter electrodes 21 and the second counter electrodes 22 are also connected to a rectifier circuit 62 to allow electric energy to be taken out from the respective electrodes.

In the circuit configuration in the third modification example, with the rotation of the electret substrate 3, charges are induced in the first counter electrodes 11 when the first electret films 31 are directly opposed to the first counter electrodes 11 while a state in which charges are induced in the second counter electrodes 21 when the second electret films 32 are directly opposed to the second counter electrodes 21 shifts to a state in which charges are induced in the second counter electrodes 22 when the second electret films 32 are directly opposed to the second counter electrodes 22. Therefore, as the electret substrate 3 is rotated, charges are induced in the first counter electrodes 1 and the second counter electrodes 2 more frequently, and electric energy can be taken out more efficiently.

In FIG. 13, illustration is given of the example in which the first counter electrodes 1 and the second counter electrodes 2 are fixedly arranged so as to have different phases in the movement direction of the electret substrate 3, but the present invention is not limited thereto. As illustrated in FIG. 1, the first counter electrodes 1 and the second counter electrodes 2 may be fixedly arranged so as to have the same phases with respect to the movement direction of the electret substrate 3.

Next, a second embodiment of the present invention is described with reference to FIG. 14 to FIG. 16.

Figure 14:
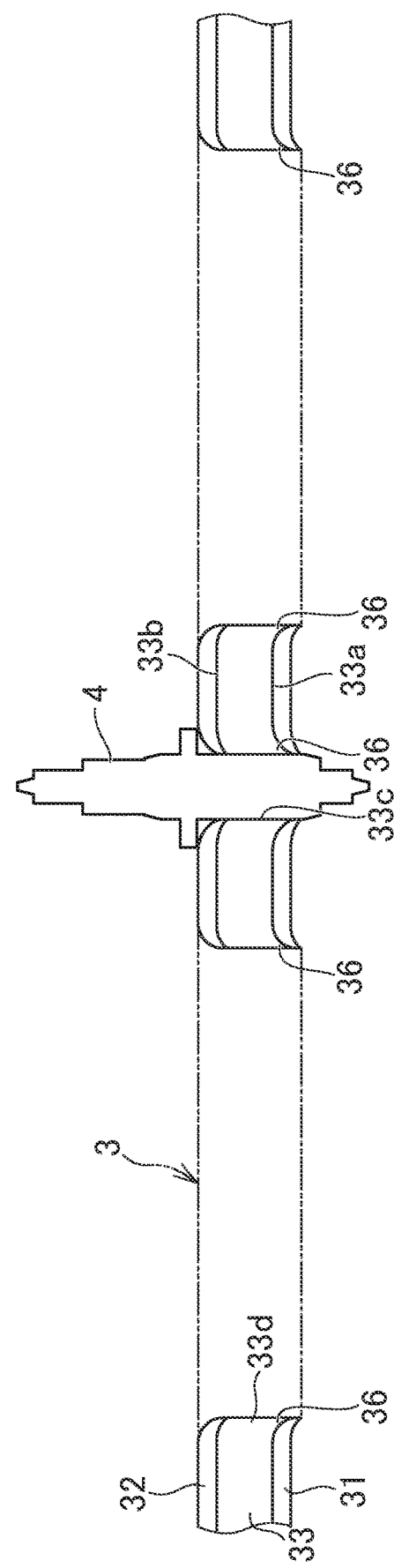
FIG. 14 is a schematic end view of an electret substrate and a rotary shaft included in an electrostatic induction transducer according to a second embodiment of the present invention.
Figure 15:
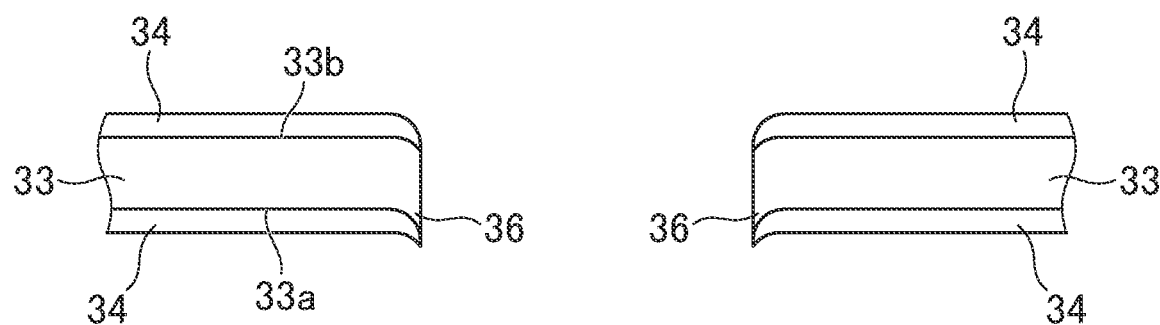
FIG. 15 is a partially enlarged view for schematically illustrating how cut end surfaces appear immediately after the punching process is performed on a conductive substrate provided with electret material films on both sides in the second embodiment.

FIG. 14 is a schematic end view of an electret substrate and a rotary shaft included in the electrostatic induction transducer according to the second embodiment. FIG. 15 is a partially enlarged view for schematically illustrating how cut end surfaces appear immediately after the punching process is performed on a conductive substrate provided with electret material films on both sides in the second embodiment. In FIG. 15, the shapes of the end surfaces given when the conductive substrate 33 is punched out from the second surface 33b side toward the first surface 33a side by the blade of the punching die are illustrated. As illustrated in FIG. 15, the burrs 36 protruding in the punching direction are caused at the edge portions of the conductive substrate 33 by the punching process.

Figure 16:
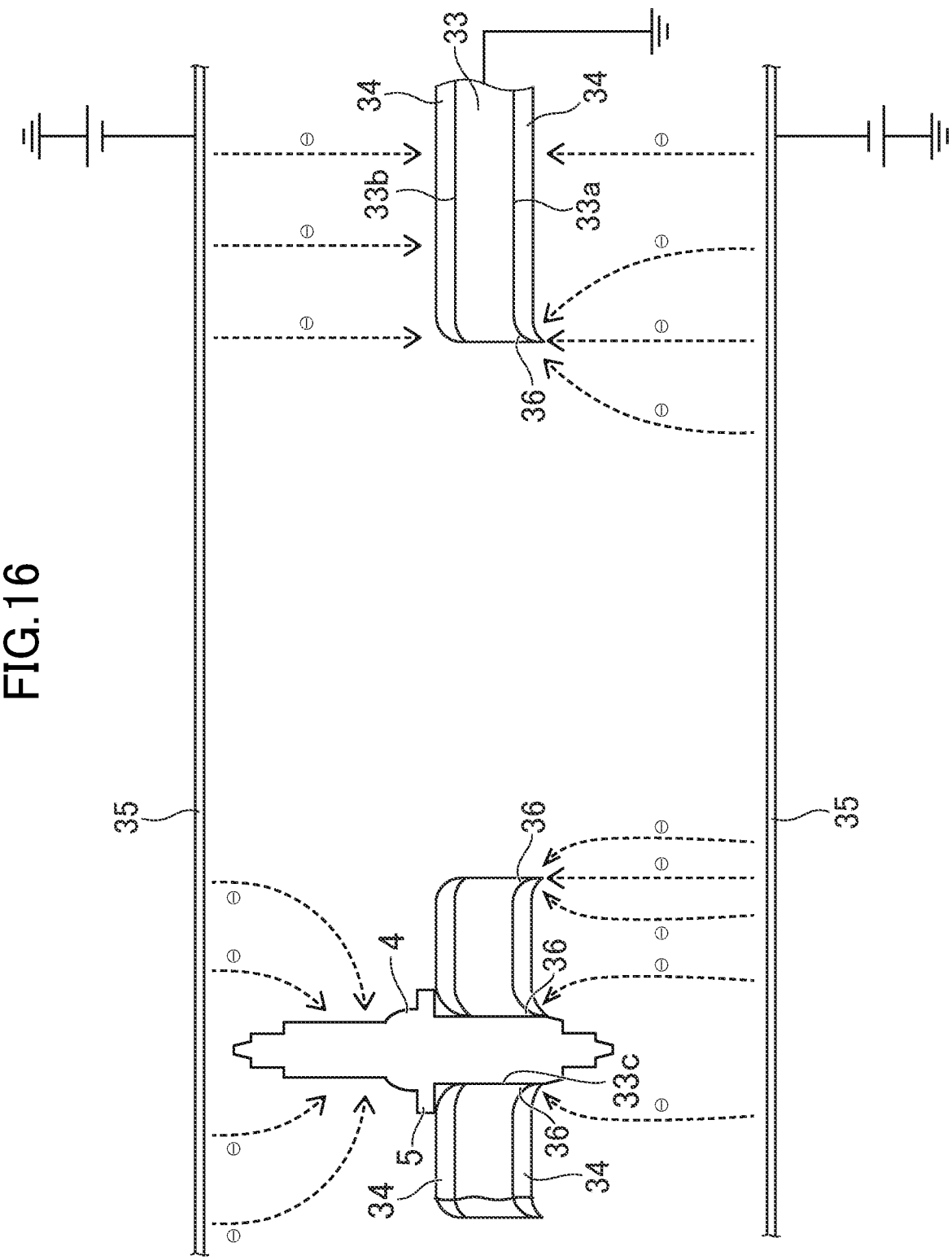
FIG. 16 is a view for illustrating an influence of burrs and the rotary shaft to be exerted on the charging process in the second embodiment.

FIG. 16 is a view for illustrating an influence of the burrs and the rotary shaft to be exerted on the charging process. In the second embodiment, described is made of an example in which the same voltage is applied to each of the first surface 33a side and the second surface 33b side to perform the charging process.

When the conductive substrate 33 having the burrs 36 is grounded and subjected to the charging process, which is the corona discharge process in the second embodiment, lines of electric force concentrate at the burrs 36 on the surface from which the burrs 36 protrude as illustrated in FIG. 16, and the discharged charges are caused to flow to the conductive substrate 33, to thereby cause a decrease in amount of charge applied to the electret material film 34 in the vicinity of the burrs 36. In FIG. 16, the broken line arrows indicate the lines of electric force and the movement of charges released along the lines of electric force.

This phenomenon occurs on the surface from which the burrs 36 protrude (first surface 33a illustrated in FIG. 16), and does not occur on the opposite surface (second surface 33b illustrated in FIG. 16). Therefore, an imbalance in charge amount of the electretmaterial film 34 occurs between above and below the surfaces of the conductive substrate 33. In the example illustrated in FIG. 16, the electret material film 34 provided on the second surface 33b has a charge amount larger than a charge amount of the electret material film 34 provided on the first surface 33*a*.

In this case, the burr 36 is not the only factor that exerts an influence on the charge amount in the charging process. The rotary shaft 4 protrudes from the conductive substrate 33 in its normal direction, and is a conductive member electrically connected to the conductive substrate 33 which is grounded. Therefore, the lines of electric force concentrate on the rotary shaft 4 as well during the charging process, to thereby inhibit the charging of the electret material film 34 in its vicinity. Then, the influence becomes more conspicuous as the length by which the rotary shaft 4 protrudes in the normal direction becomes longer, that is, as the rotary shaft 4 becomes closer to the discharge electrode.

When the length by which the rotary shaft 4 protrudes in the direction toward the first surface 33*a* of the conductive substrate 33, and the length by which the rotary shaft 4 protrudes in the direction toward the second surface 33*b* of the conductive substrate 33 are equal to each other, the influences of the charging on the electret material films 34 are substantially the same on both sides of the substrate 3, which avoids causing an imbalance between the charge amounts of the first electret film 31 and the second electret film 32. However, the rotary shaft 4 is assembled together with the pinion 5 and provided with the driving mechanism including, for example, the gear (not shown) configured to mesh with the pinion 5, which correspondingly causes the rotary shaft 4 to significantly protrude on one side.

In view of the foregoing, in the second embodiment, the burrs 36 are set to be formed on a side opposite to the side with a larger protrusion amount of the rotary shaft 4. That is, the rotary shaft 4 is provided such that the protrusion amount on the second surface 33*b* side is larger than the protrusion amount on the first surface 33*a* side in the direction perpendicular to the conductive substrate 33, to thereby balance the charge amounts on both sides of the conductive substrate 33. While the charge amount of the electret film becomes smaller on the side with the larger protrusion amount of the rotary shaft 4, the charge amount of the electret film also becomes smaller on the side on which the burrs 36 are formed. Therefore, the side with a larger protrusion amount of the rotary shaft 4 and the side on which the burrs 36 are formed are set to be opposite to each other, to thereby be able to balance the charge amounts on both sides of the conductive substrate 33. This reduces the rotation resistance of the electret substrate 3, and a loss of energy is less liable to occur. That is, it is possible to suppress a decrease in energy conversion efficiency. In addition, the reduction in rotation resistance suppresses wear of the rotary shaft 4 or other such component, and also suppresses a decrease in service life of the electrostatic induction transducer 100.

In the second embodiment, the conductive shaft is illustrated as the supported member, but the present invention is not limited thereto, and any shaft may be employed as long as the shaft is electrically connected to the conductive substrate and protrudes in the direction perpendicular to the conductive substrate. The supported member may be provided so as to have a larger protrusion amount on anyone of the upper side and the lower side in the housing. Any supported member may be provided as long as the protrusion amount is larger at least on the side opposite to the side on which the burrs 36 protrude.

Next, a third embodiment of the present invention is described with reference to FIG. 17 to FIG. 25.

Figure 17:
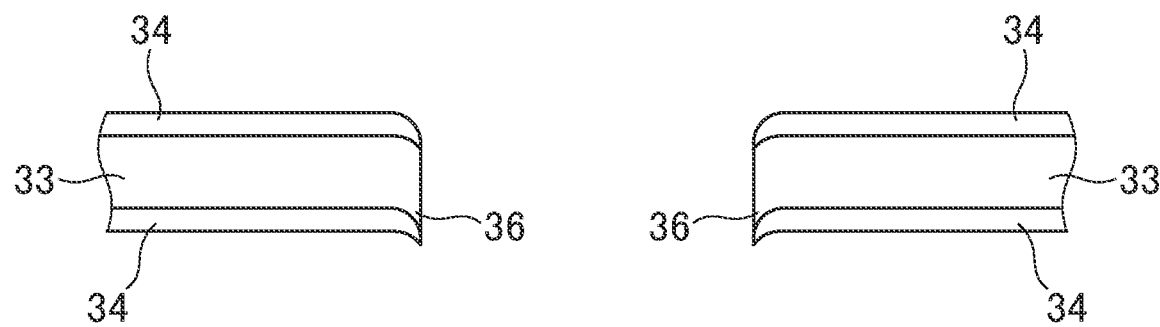
FIG. 17 is a partially enlarged view for schematically illustrating how cut end surfaces appear immediately after the punching process is performed on a conductive substrate having electret material films formed on both sides in a third embodiment of the present invention.

FIG. 17 is a partially enlarged view for schematically illustrating how cut end surfaces appear immediately after the punching process is performed on a conductive substrate provided with electret material films on both sides in the third embodiment. In FIG. 17, the shapes of the end surfaces given when the conductive substrate 33 is punched out from the upper portion of the conductive substrate 33 by the blade of the punching die are illustrated. As illustrated in FIG. 17, the burrs 36 protruding in the punching direction are caused at the edge portions of the conductive substrate 33 by the punching process.

Figure 18:
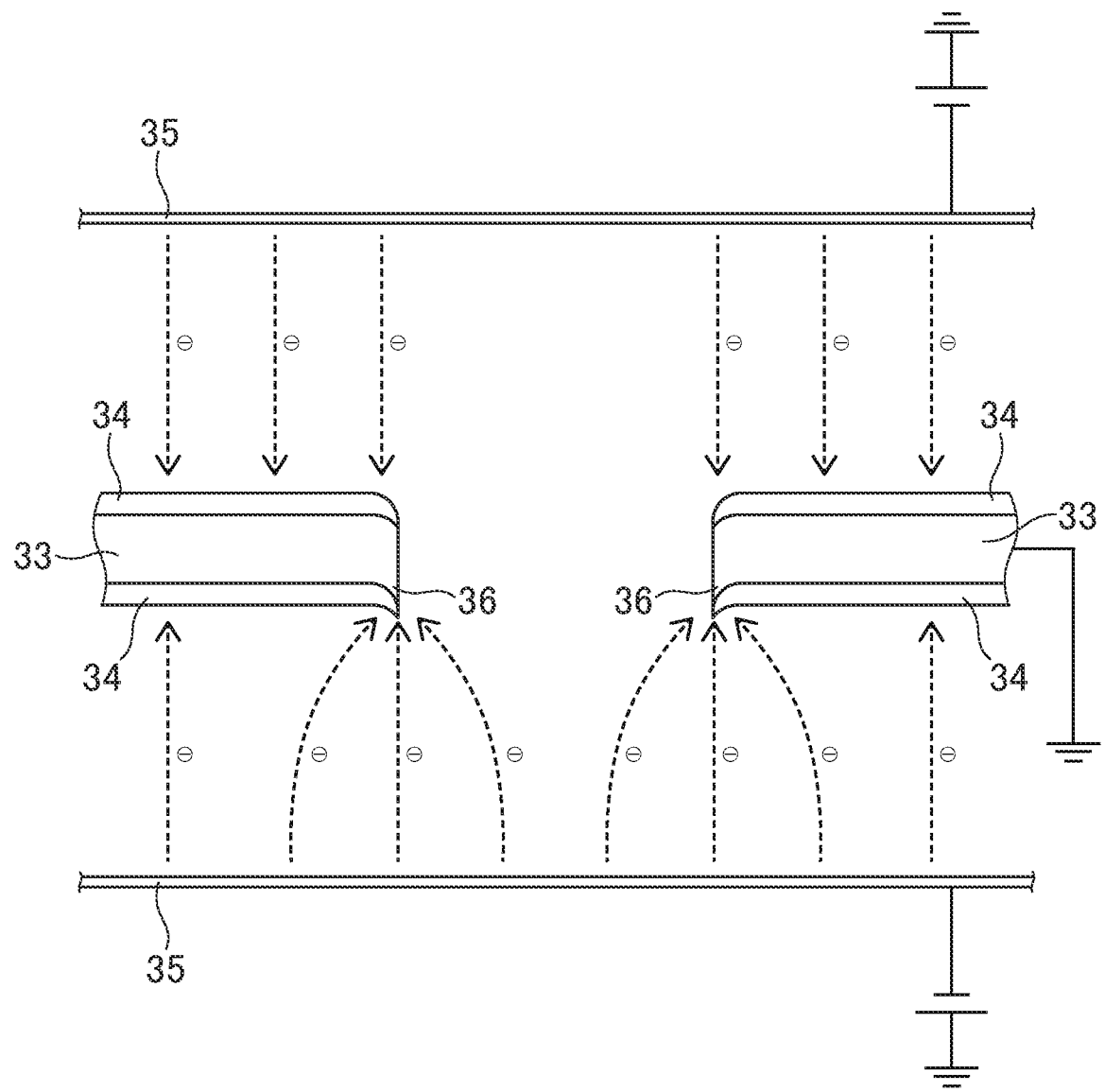
FIG. 18 is a view for illustrating an influence of burrs to be exerted on a discharge surface treatment in the third embodiment.

FIG. 18 is a view for illustrating an influence of the burrs to be exerted on the discharge surface treatment. When the conductive substrate 33 having the burrs 36 is grounded and subjected to the discharge surface treatment, which is the corona discharge process in the second embodiment, lines of electric force concentrate at the burrs 36 on the surface from which the burrs 36 protrude as illustrated in FIG. 18, and the discharged charges are caused to flow to the conductive substrate 33, to thereby cause a decrease in amount of charge applied to the electret material film 34 in the vicinity of the burrs 36. In FIG. 18, the broken line arrows indicate the lines of electric force and the movement of charges released along the lines of electric force.

This phenomenon occurs on the surface from which the burrs 36 protrude, and does not occur on the opposite surface. Therefore, an imbalance in charge amount of the electret material film 34 occurs between above and below the surfaces of the conductive substrate 33. In the example illustrated in FIG. 16, the electret material film 34 provided on an upper side in FIG. 18 has a charge amount larger than a charge amount of the electret material film 34 provided on a lower side in FIG. 18.

In view of the foregoing, in the third embodiment, the punching process using the press is divided into a plurality of steps, and the punching process is performed both from one surface side of the conductive substrate 33 and from another surface of the conductive substrate 33. The electret substrate 3 is thus produced so as to cause the burrs 36 of the conductive substrate 33 to protrude on both sides of the conductive substrate 33.

Figure 19A:
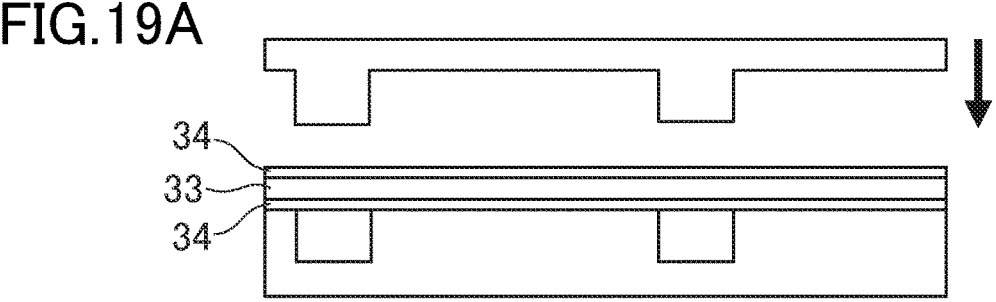
FIG. 19A is a view for schematically illustrating a punching process step in the third embodiment.
Figure 19B:
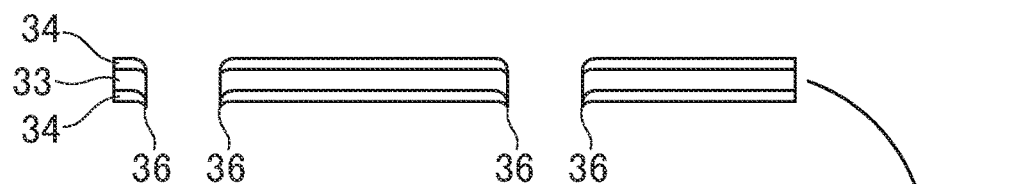
FIG. 19B is a view for schematically illustrating a punching process step in the third embodiment.

FIG. 19A to FIG. 19D are views for schematically illustrating the punching process steps in the third embodiment. First, as illustrated in FIG. 19A, the punching process is performed on the conductive substrate 33 having the electret material film 34 formed on both sides. At this time, some of edges of the electret substrate 3 to be finally obtained are punched out. As a result, as illustrated in FIG. 19B, the conductive substrate 33 having the edges at which the burrs 36 protrude in one direction (in the downward direction in FIG. 19B) is obtained.

Figure 19C:
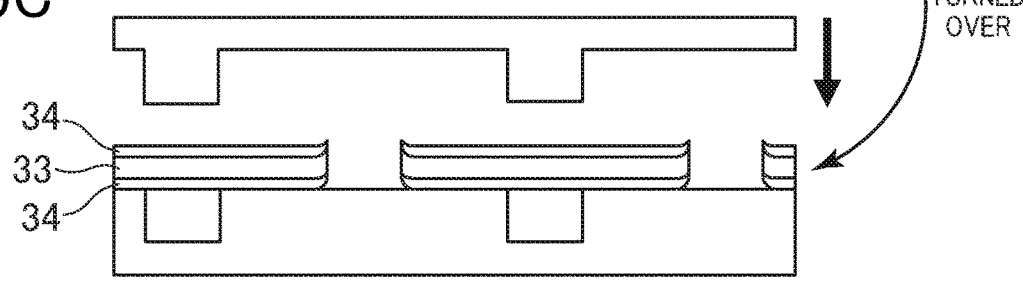
FIG. 19C is a view for schematically illustrating a punching process step in the third embodiment.
Figure 19D:
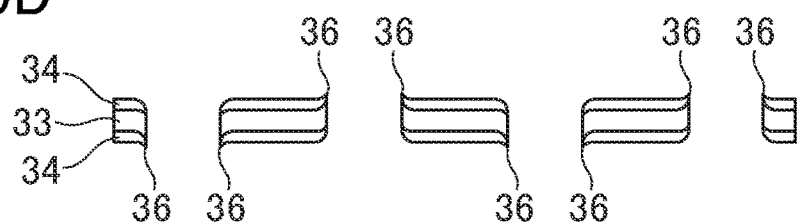
FIG. 19D is a view for schematically illustrating a punching process step in the third embodiment.

In addition, the conductive substrate 33 is turned over, and is placed on a punching die as illustrated in FIG. 19C to be subjected to the punching process. The die used at this time is not required to be the same as the punching die illustrated in FIG. 19A, and the die may be manufactured in accordance with the shape of the electret substrate 3 to be finally obtained. As a result, as illustrated in FIG. 19D, the conductive substrate 33 has the burrs 36 formed in FIG. 19A so as to protrude in one direction (upward direction in FIG. 19A) and the burrs 36 formed so as to protrude in FIG. 19C in another direction (downward direction in FIG. 19C).

In this manner, the burrs 36 can be formed so as to protrude in the directions on both sides of the substrate 33, and hence, as described with reference to FIG. 18, the charge amounts of the electret material films 34 on both sides can be balanced without being biased toward the electret material film on one side of the substrate 33. The concentration of the lines of electric force described with reference to FIG. 18 is caused along the burrs 36 formed at the edges of the conductive substrate 33. Therefore, assuming that the edges having the burrs 36 protruding in the direction of one surface of the conductive substrate 33 is referred to as "first edge portion", and the edges having the burrs 36 protruding in the direction of another surface of the substrate 33 are referred to as "second edge portion", it is possible to control the charge amount of the electret material films 34 on both sides of the conductive substrate 33 to some extent by controlling the total length of the first edge portion and the total length of the second edge portion.

Figure 20:
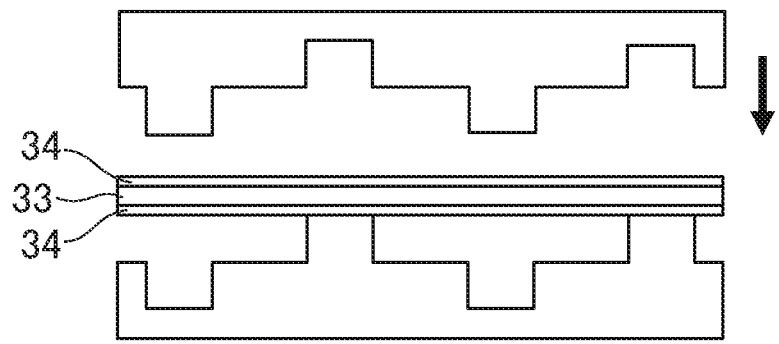
FIG. 20 is a view for schematically illustrating a process step of simultaneously forming a first edge portion and a second edge portion by a single punching process step.

In FIG. 19A to FIG. 19D, two punching process steps are illustrated, but the present invention is not limited thereto, and three or more punching process steps may be performed as required. In another case, as schematically illustrated in FIG. 20, the first edge portion and the second edge portion may be simultaneously formed by a single punching process step. In a punching die illustrated in FIG. 20, a protruding portion to be a punching blade and a recess portion to be a portion for receiving the punching blade are formed in each of an upper die and a lower die paired with the upper die. The protruding portion and the recess portion are each formed so as to have a shape complementary to that of the counterpart of the pair.

Figure 21:
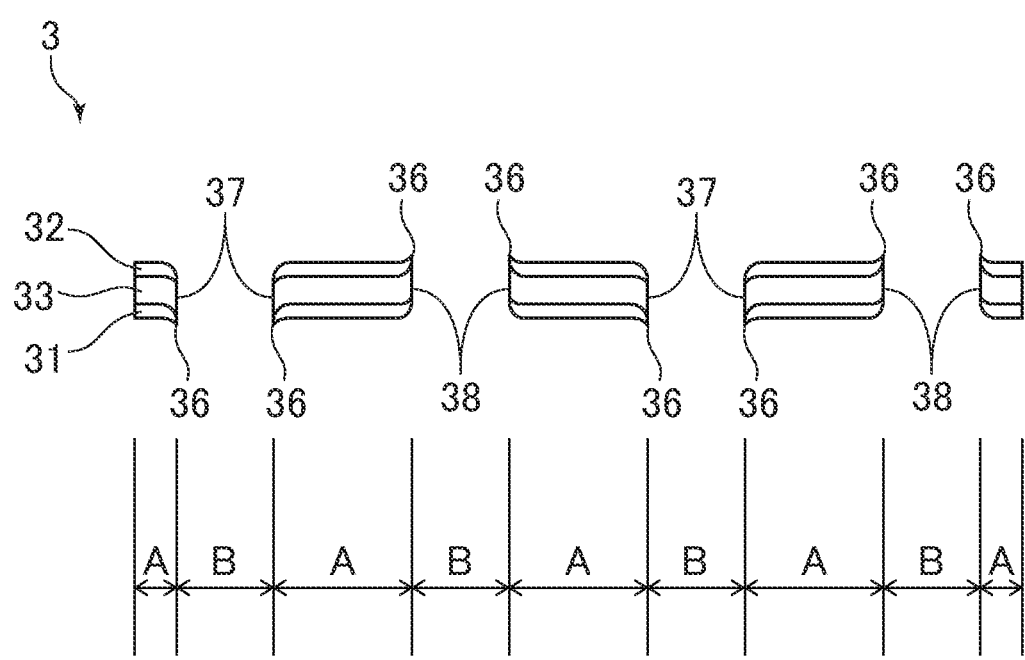
FIG. 21 is a schematic view for illustrating an example of the cross-sectional shapes of cut end surfaces along the movement direction of an electret substrate in the in-plane direction in the third embodiment.

The features of the shape of the electret substrate 3 produced in this manner are described with reference to FIG. 21. FIG. 21 is a schematic view for illustrating an example of the cross-sectional shapes of cut end surfaces along the movement direction of the electret substrate in the in-plane direction in the third embodiment.

The electret substrate 3 has the first electret film 31 formed on one surface (lower surface in FIG. 21) of the conductive substrate 33 and the second electret film 32 formed on another surface (upper surface in FIG. 21). In the cross section, a presence region A in which the conductive substrate 33 is present and an absence region B in which the conductive substrate 33 is absent are set. The absence region B is formed by the punching process, and hence the burrs 36 are formed at the edges of the conductive substrate 33 adjacent to the absence region B.

At this time, the burrs 36 protrude in the same direction at edges belonging to a given absence region B, that is, edges around a specific absence region. This is because one absence region B is formed by the punching process in a single direction. Therefore, the edge portion adjacent to one absence region B is any one of a first edge portion 37 and a second edge portion 38.

As schematically illustrated in FIG. 21, when adjacent absence regions B are formed by the punching process steps in different directions, the direction in which the burrs 36 protrude in each of the adjacent absence regions B is different in a staggered manner. That is, when the edge portion adjacent to one absence region B is the first edge portion 37, the edge portion adjacent to another absence region B adjacent to the one absence region B is the second edge portion 38. Meanwhile, when the edge portion adjacent to one absence region B is the second edge portion 38, the edge portion adjacent to another absence region B adjacent to the one absence region B is the first edge portion 37.

As a matter of course, the direction in which the burrs 36 protrude in each of the adjacent absence regions B is not required to be different in a staggered manner. However, the structure illustrated in FIG. 21 is advantageous in that the charge amount is distributed substantially evenly throughout the entire electret substrate 3, which is less liable to cause a bias, and that the charge amounts of the first electret film 31 and the second electret film 32 are easily balanced.

As described above, in consideration of only the burrs 36 of the conductive substrate 33, the charge amounts of the first electret film 31 and the second electret film 32 are considered to be substantially balanced when the total length of the first edge portion 37 and the total length of the second edge portion 38 at the edges of the conductive substrate 33 of the electret substrate 3 are equal to each other. However, the burr 36 is not the only factor that exerts an influence on the charge amount in the discharge surface treatment.

The rotary shaft 4 is mounted to the electret substrate 3, and the rotary shaft 4 is also made of aluminum or other such metal, and is conductive in some cases. This is because the electret substrate 3 is electrically connected to the conductive substrate 33 through the rotary shaft 4 during the discharge surface treatment or when the electret substrate 3 is assembled to the electrostatic induction transducer 100.

The rotary shaft 4 is also a conductive member protruding in the normal direction of the conductive substrate 33, and hence the lines of electric force concentrate on the rotary shaft 4 during the discharge surface treatment, to thereby inhibit the charging of the electret material film 34 in its vicinity. Then, the influence becomes more conspicuous as the length by which the rotary shaft 4 protrudes in the normal direction becomes longer, that is, as the rotary shaft 4 becomes closer to the discharge electrode.

In this case, when the length by which the rotary shaft 4 protrudes in a direction toward one surface of the electret substrate 3 and the length by which the rotary shaft 4 protrudes in a direction toward another surface of the electret substrate 3 are equal to each other, the influences of the charging on the electret material films 34 are substantially the same on both sides of the substrate 3, which avoids causing an imbalance between the charge amounts of the first electret film 31 and the second electret film 32. However, the pinion 5 is assembled on one side of the rotary shaft 4, that is, on the first surface side in the third embodiment, and hence the length by which the rotary shaft 4 extends to one surface side is longer than the length by which the rotary shaft 4 extends to another surface side by a length corresponding to the assembled pinion 5.

In this case, the influence of the rotary shaft 4 that inhibits the electret material film 34 from being charged is larger on the one surface side than on the another surface side. Therefore, when no countermeasures are taken, the charge amount of the first electret film 31 becomes smaller than the charge amount of the second electret film 32. Therefore, the length of the second edge portion 38 is set longer than the length of the first edge portion 37 to intentionally cause the influence of the burrs 36 protruding on the another surface side to become larger than the influence of the burrs 36 protruding on the one surface side. With this configuration, it is possible to cancel an imbalance between the charge amount of the first electret film 31 and the charge amount of the second electret film 32, which is caused by the rotary shaft 4.

This is not limited to only the case in which the supported member is the rotary shaft 4. To describe more generally, when the electret substrate 3 is provided with a freely-selected supported member being conductive and protruding in the normal direction of the electret substrate 3 and the length by which the supported member extends to one surface side is longer than the length by which the supported member extends to another surface side, it is preferred that the total length of the second edge portion 38 be longer than the total length of the first edge portion 37.

Figure 22:
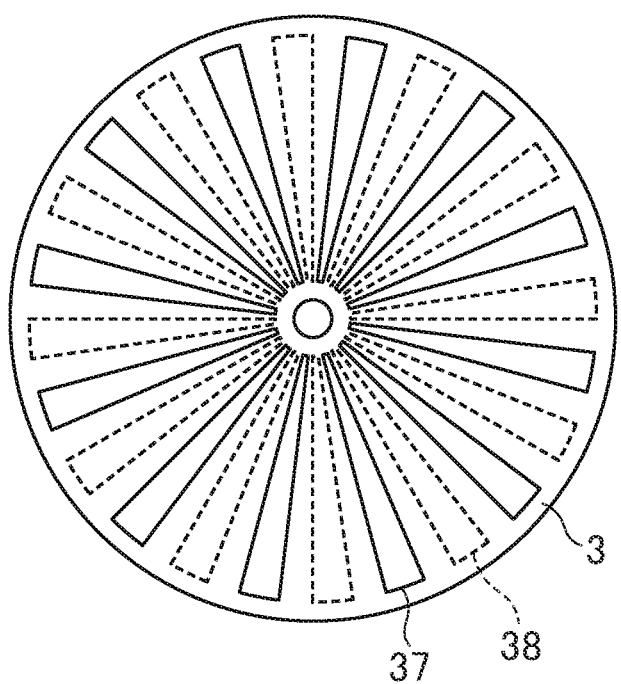
FIG. 22 is a plan view of the electret substrate in the third embodiment.

FIG. 22 is a plan view of the electret substrate in the third embodiment. The electret substrate 3 has a disk shape as a whole, and in this case, has a wheel shape, that is, a shape in which a portion extending in the circumferential direction in the vicinity of the center and an outer peripheral portion extending in the circumferential direction are connected to each other by a large number of spokes. At the center of the electret substrate 3, there is formed a hole for mounting the rotary shaft 4. In FIG. 22, the contour of the first edge portion 37 is indicated by the solid line, and the contour of the second edge portion 38 is indicated by the broken line. In the third embodiment, the electret substrate 3 is rotated about the rotary shaft 4.

In the example illustrated in FIG. 22, the directions in which the burrs 36 protrude in the absence regions adjacent in the rotation direction of the electret substrate 3 are opposite to each other, and the number of absence regions adjacent to edges included in the first edge portion 37 and the number of absence regions adjacent to edges included in the second edge portion 38 are equal to each other, but the present invention is not limited to such an arrangement. The number of absence regions adjacent to edges included in the first edge portion 37 and the number of absence regions adjacent to edges included in the second edge portion 38 may be different from each other, and may have a ratio of, for example, 2:1. In the example illustrated in FIG. 22, the number of absence regions is 24, which is merely an example, and may be freely set.

Figure 23:
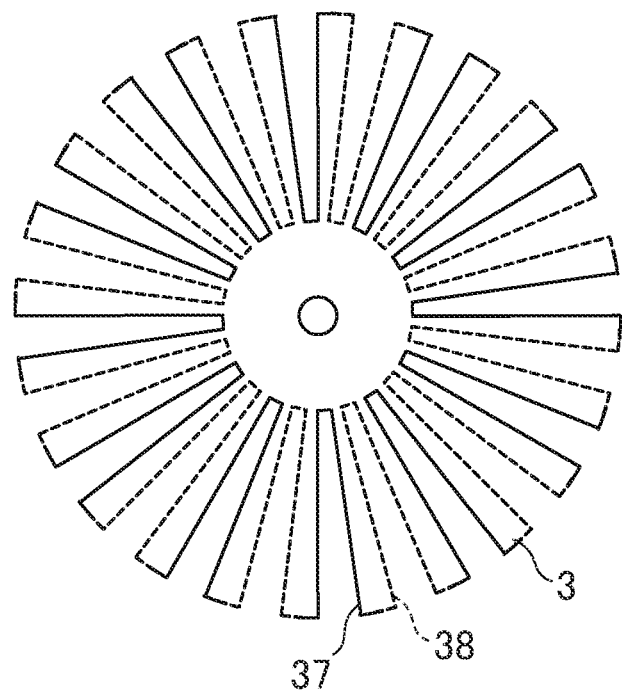
FIG. 23 is a plan view of an electret substrate in a first modification example of the third embodiment.

FIG. 23 is a plan view of an electret substrate in a first modification example of the third embodiment. In the first modification example of the third embodiment, the electret substrate 3 has a shape having a large number of tongue portions extending radially from the central part while maintaining a disk shape as a whole. In FIG. 23, in the same manner as in FIG. 22, the contour of the first edge portion 37 is indicated by the solid line. The contour of the second edge portion 38 is indicated by the broken line. The directions in which the burrs 36 protrude at both edges of the tongue portions in their longitudinal directions are opposite to each other. As a matter of course, the illustrated configuration is merely an example. There may be provided tongue portions having the same direction in which the burrs 36 protrude at both edges in the longitudinal directions, and the number of tongue portions is freely set.

Figure 24:
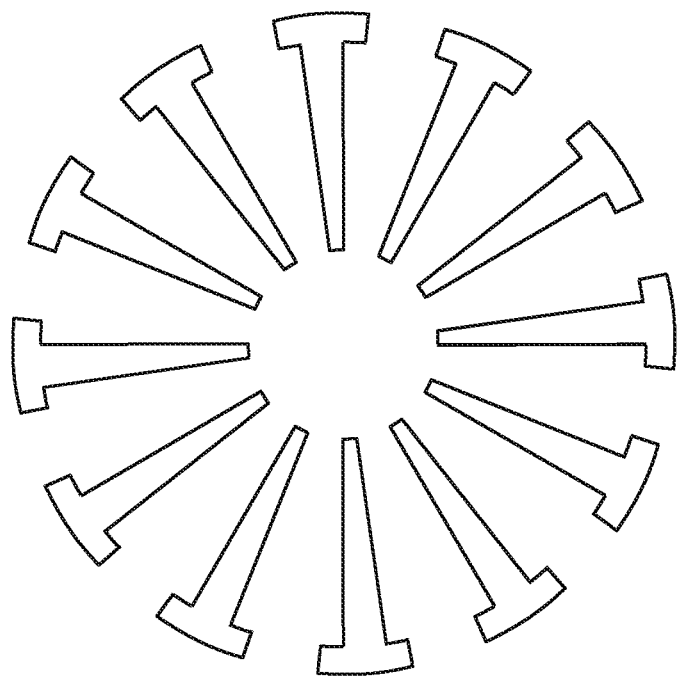
FIG. 24 is a view for illustrating the shapes of blades of a punching die to be used for producing the electret substrate in the first modification example of the third embodiment.

When the electret substrate 3 illustrated in FIG. 23 is produced by the punching process, such a punching die as illustrated in, for example, FIG. 24 may be used to form the shape. FIG. 24 is a view for illustrating the shapes of blades of the punching die to be used for producing the electret substrate in the first modification example of the third embodiment. After punching the conductive substrate 33 as illustrated in FIG. 19A through use of the punching die having the shape illustrated in FIG. 24, the conductive substrate 33 is turned over and rotated by 15 degrees. Under this state, the conductive substrate 33 is punched out from the opposite side as illustrated in FIG. 19C again through use of the punching die illustrated in FIG. 24, to thereby produce the electret substrate 3 illustrated in FIG. 23. Amounting hole for the rotary shaft 4 may be formed simultaneously with any one of the punching process steps and another process step.

Figure 25:
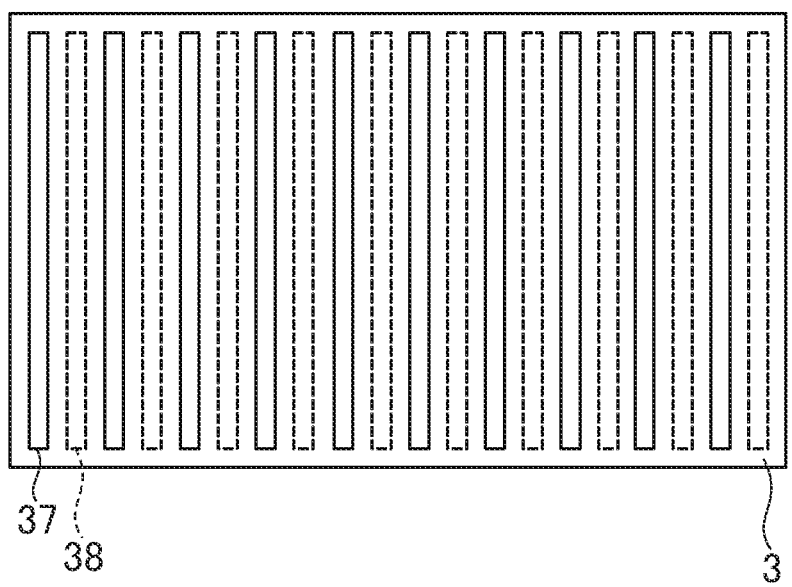
FIG. 25 is a plan view of an electret substrate in a second modification example of the third embodiment.

FIG. 25 is a plan view of an electret substrate in a second modification example of the third embodiment. The movement of the electret substrate 3 is not limited to the rotary motion that has been described above, and may be reciprocating motion or translational motion. In such a case, the electret substrate 3 having such a rectangular shape as illustrated in FIG. 25 may be used.

The electret substrate 3 is caused to move in the left-right direction in FIG. 25. The absence region is formed so as to have a long and narrow slit shape perpendicular to the movement direction, and hence the electret substrate 3 has such a rectangular shape as to have a large number of slits formed therein. In FIG. 25, the contour of the first edge portion 37 is indicated by the solid line. The contour of the second edge portion 38 is indicated by the broken line. The number of absence regions adjacent to edges included in the first edge portion 37 and the number of absence regions adjacent to edges included in the second edge portion 38 may be different from each other, and the number of absence regions is freely set, which are the same points as those described above in the other embodiments. The electret substrate 3 having such a shape is suitable when the electrostatic induction transducer 100 using the electret substrate 3 is a so-called vibration power generator configured to pick up vibrations in a specific direction to convert the vibrations into electric power. As a matter of course, the electret substrate 3 may be used for other purposes.

In each of the embodiments described above, as described with reference to, for example, FIG. 5B, the electret material film 34 is formed on the conductive substrate 33, and then the conductive substrate 33 and the electret material film 34 are processed together. Specifically, after the electret material film 34 is formed on the conductive substrate 33, the press working is performed the conductive substrate 33 and the electret material film 34. With this configuration, compared to the case in which the electret material film 34 is formed after only the conductive substrate 33 is subjected to the process, it is possible to improve the matching accuracy of the shapes of the conductive substrate 33 and the electret material film 34, and to achieve reduction in machining man-hour. As a result, it is possible to reduce costs for the manufacturing process.

In each of the above-described embodiments, the example of subjecting the conductive substrate 33 and the electret material film 34 to the press working has been described, but the present invention is not limited thereto. The same effect can be attained even when, for example, the electret material film 34 is formed on the conductive substrate 33 and then subjected to laser machining to form a through hole or other such portion. When the laser machining is performed, the states of remaining portions of the electret material film 34 are different between a surface on a laser irradiation side and the opposite side surface. Specifically, the area of the electret material film 34 in plan view is smaller on the surface on the laser irradiation side than on the opposite side surface. As a result, the charge amount become different between the first surface 33a and the second surface 33b.

For example, when laser light is applied from the first surface 33a side, the charge amount of the first surface 33a is smaller than that of the second surface 33b. In this case, the rotary shaft 4 is mounted to the conductive substrate 33 such that the protrusion amount on the second surface 33b side is larger than the protrusion amount on the first surface 33a side in the direction perpendicular to the conductive substrate 33, to thereby be able to balance the charge amounts on both sides of the conductive substrate 33 irrespective of the manufacturing variations due to the laser machining.

Meanwhile, for example, when laser light is applied from the second surface 33b side, the charge amount of the second surface 33b is smaller than that of the first surface 33a. In this case, the rotary shaft 4 is mounted to the conductive substrate 33 such that the protrusion amount on the second surface 33b side is larger than the protrusion amount on the first surface 33a side in the direction perpendicular to the conductive substrate 33, and hence the first surface 33a having a larger charge amount is present on the side opposite to the side with a larger protrusion amount of the rotary shaft 4, to thereby be capable of balancing the charge amounts on both sides of the conductive substrate 33.

In the above, each of the embodiments according to the present invention are described. However, the specific configurations described in the embodiments are described as examples, and are not intended to limit the technical scope of the present invention to those embodiments. Various modifications may be made by a person skilled in the art to those disclosed embodiments. It is to be understood that the technical scope of the invention disclosed herein cover all such modifications.

What is claimed is:

1. An electrostatic induction transducer, comprising:
    an electret substrate including:
        a conductive substrate;
        a first electret film, which is provided on a first surface of the conductive substrate, and is charged; and
        a second electret film, which is provided on a second surface of the conductive substrate, and is charged;
    a supported member being conductive, which is mounted to the electret substrate so as to be electrically connected to the conductive substrate, and is supported so as to allow the electret substrate to move in an in-plane direction;
    a first counter electrode arranged so as to face the first electret film; and
    a second counter electrode arranged so as to face the second electret film,
    wherein the conductive substrate has a burr protruding on a side of the second surface at an edge portion of the conductive substrate, and
    wherein the supported member is provided so as to cause a first protrusion on the side of the second surface to become larger than a second protrusion on a side of the first surface in a direction perpendicular to the conductive substrate.

2. The electrostatic induction transducer according to claim 1, further comprising:
    a first counter substrate having a disk shape, which is arranged so as to face the first electret film; and
    a second counter substrate having a disk shape arranged so as to face the second electret film,
    wherein the first counter electrode includes a plurality of first counter electrodes provided on the first counter substrate so as to be arranged at intervals in a circumferential direction of the first counter substrate, and
    wherein the second counter electrode includes a plurality of second counter electrodes provided on the second counter substrate so as to be arranged at intervals in a circumferential direction of the second counter substrate.

3. The electrostatic induction transducer according to claim 2,
    wherein at least one of the first counter substrate and the second counter substrate comprises a transparent substrate, and
    wherein at least one of the first counter electrode and the second counter electrode that is provided on the transparent substrate comprises a transparent electrode.

4. The electrostatic induction transducer according to claim 1, wherein the first counter electrode and the second counter electrode are arranged to overlap in at least one part in a plan view, so as to have different phases with respect to a movement direction of the electret substrate.

5. The electrostatic induction transducer according to claim 1,
    wherein the supported member includes a rotary shaft for the electret substrate,
    wherein the conductive substrate has a shaft hole through which the rotary shaft is inserted, and
    wherein the edge portion which has the burr protruding on the side of the second surface includes an edge portion of the shaft hole.

6. A wristwatch, comprising:
    the electrostatic induction transducer of claim 1; and
    a dial having a viewing region,
    wherein the electrostatic induction transducer is arranged so as to overlap with the viewing region in plan view and so as to cause the second surface to face the dial.

7. An electrostatic induction transducer, comprising:
    an electret substrate including:
        a conductive substrate;
        a first electret film, which is provided on a first surface of the conductive substrate, and is charged; and
        a second electret film, which is provided on a second surface of the conductive substrate, and is charged;
    a supported member being conductive, which is mounted to the electret substrate so as to be electrically connected to the conductive substrate, and is supported so as to allow the electret substrate to move in an in-plane direction;
    a first counter electrode arranged so as to face the first electret film; and
    a second counter electrode arranged so as to face the second electret film,
    wherein the conductive substrate has a burr protruding on a side of the first surface at an edge portion of the conductive substrate, and
    wherein the supported member is provided so as to cause a first protrusion on the side of the second surface to become larger than a second protrusion on a side of the first surface in a direction perpendicular to the conductive substrate.

8. The electrostatic induction transducer according to claim 7, further comprising:
    a first counter substrate having a disk shape, which is arranged so as to face the first electret film; and
    a second counter substrate having a disk shape arranged so as to face the second electret film,
    wherein the first counter electrode includes a plurality of first counter electrodes provided on the first counter substrate so as to be arranged at intervals in a circumferential direction of the first counter substrate, and
    wherein the second counter electrode includes a plurality of second counter electrodes provided on the second counter substrate so as to be arranged at intervals in a circumferential direction of the second counter substrate.

9. The electrostatic induction transducer according to claim 8,
    wherein at least one of the first counter substrate and the second counter substrate comprises a transparent substrate, and
    wherein at least one of the first counter electrode and the second counter electrode that is provided on the transparent substrate comprises a transparent electrode.

10. The electrostatic induction transducer according to claim 7, wherein the first counter electrode and the second counter electrode are arranged to overlap in at least one part in plan view, so as to have different phases with respect to a movement direction of the electret substrate.

11. The electrostatic induction transducer according to claim 7,
wherein the supported member includes a rotary shaft for the electret substrate,
wherein the conductive substrate has a shaft hole through which the rotary shaft is inserted, and
wherein the edge portion having the burr protruding on the side of the first surface includes an edge portion of the shaft hole.

12. An electrostatic induction transducer, comprising:
an electret substrate, which is supported so as to be allowed to move in an in-plane direction, and includes:
a substrate being conductive;
a first electret film formed on a first surface of the substrate; and
a second electret film formed on a second surface of the substrate;
a first counter electrode arranged so as to face the first electret film; and
a second counter electrode arranged so as to face the second electret film,
the electret substrate includes a plurality of edge portions,
wherein the plurality of edge portions includes:
a first edge portion at which a burr of the substrate protrudes in a direction toward the first surface; and
a second edge portion at which a burr of the substrate protrudes in a direction toward the second surface.

13. The electrostatic induction transducer according to claim 12,
wherein the electret substrate has, along a movement direction of the electret substrate in the in-plane direction, a presence region in which the substrate is present and an absence region in which the substrate is absent, and
wherein at least one of the first edge portion and the second edge portion is adjacent to the absence region.

14. The electrostatic induction transducer according to claim 13, wherein the absence region includes a first absence region and a second absence region adjacent to the first absence region,
the first edge portion is adjacent to the first absence region, and,
the second edge portion is adjacent to the second absence region.

15. The electrostatic induction transducer according to claim 12,
wherein the electret substrate is provided with a supported member being conductive and protruding in a normal direction of the electret substrate,
wherein a length by which the supported member extends to a side of the first surface is longer than a length by which the supported member extends to a side of the second surface, and
wherein the second edge portion has a total length longer than a total length of the first edge portion.

* * * * *